US008666961B1

(12) United States Patent
Qureshi et al.

(10) Patent No.: US 8,666,961 B1
(45) Date of Patent: Mar. 4, 2014

(54) PLATFORM FOR GENERATING, MANAGING AND SHARING CONTENT CLIPPINGS AND ASSOCIATED CITATIONS

(76) Inventors: Waheed Qureshi, Pleasanton, CA (US); Rafat Alvi, Menlo Park, CA (US)

( * ) Notice: Subject to any disclaimer, the term of this patent is extended or adjusted under 35 U.S.C. 154(b) by 0 days.

(21) Appl. No.: 13/051,912

(22) Filed: Mar. 18, 2011

Related U.S. Application Data

(60) Provisional application No. 61/315,891, filed on Mar. 19, 2010.

(51) Int. Cl.
*G06F 17/30* (2006.01)
(52) U.S. Cl.
USPC .......................................... 707/705; 707/769
(58) Field of Classification Search
USPC ................................................ 707/705, 769
See application file for complete search history.

(56) References Cited

U.S. PATENT DOCUMENTS

| | | | | |
|---|---|---|---|---|
| 6,366,923 B1 * | 4/2002 | Lenk et al. | ..................... | 707/706 |
| 6,423,503 B1 * | 7/2002 | Mikolajczyk et al. | ....... | 435/7.23 |
| 7,856,414 B2 * | 12/2010 | Zee | ...................................... | 1/1 |
| 7,917,846 B2 * | 3/2011 | Decker et al. | .................. | 715/234 |
| 8,234,640 B1 * | 7/2012 | Fitzgerald et al. | ................. | 718/1 |
| 2003/0065642 A1 * | 4/2003 | Zee | ..................................... | 707/1 |
| 2007/0226056 A1 * | 9/2007 | Belanger et al. | ................ | 705/14 |
| 2008/0196060 A1 * | 8/2008 | Varghese | .......................... | 725/34 |
| 2010/0257183 A1 * | 10/2010 | Kim et al. | ...................... | 707/748 |

\* cited by examiner

*Primary Examiner* — Kim Nguyen
(74) *Attorney, Agent, or Firm* — Knobbe, Martens, Olson & Bear, LLP

(57) ABSTRACT

A content management system allows users to capture content from content sources such as web pages and hardcopy publications, by using a client application running on personal computers and even mobile devices. The client application creates bibliography citations for captured content by gathering information from and/or about the content sources. Captured content and corresponding citations can be stored in a cloud data storage and can be searchable by other users. The client application can include a document editor facilitating importation of captured content and bibliography citations into documents being edited. Embodiments are adapted for use by course instructors and students, to facilitate, e.g., sharing of captured content among students and plagiarism checks by instructors and students. Embodiments are integrated with social networking services to facilitate sharing of content with users' contacts. An online marketplace of providers (e.g., tutors) and tutorials may be provided to enrich the collaborative learning experience.

13 Claims, 19 Drawing Sheets

Clip :: Capture Content + Create Bibliography Automatically

FIGURE 13A

Instructor's Module

| home | assignments | grade | community |

English 101 :: Research Paper :: Assignment

⊕ add part ⊖ remove part ⚙

- assignment
- rubric
- research
- pre-writing
- annotated bibliography
- thesis
- intro paragraph
- peer editing
- final draft
- tutors 🔍 search assignments ✏ edit assignment   ⊕ add multimedia   🔒 change visability   👁 see it as students do

Research Paper Project for English 101

An "I-Search" paper is a research paper that focuses on the process of doing research as much as on the subject being researched. The purpose of completing an I-Search project is twofold:
1. To help you learn more about a topic that interests you, and
2. To help you understand and gain experience with the research process.

For this paper, you have a number of subjects from which you can choose your topic. Choose a topic that interests you and that you will enjoy learning more about. Subjects to choose from include:
- A philosophy (Humanism, Existentialism, Postmodernism, Surrealism, etc.)
- A religion (Buddhism, Judaism, Islam, etc.)
- A current social justice issue (women's/gender rights, education, discrimination.
- A career (this does not include jobs like "rock star," "celebrity," "professional athlete." Examples: newscaster, teacher, cosmetologist, accountant, carpenter, etc.)
- A medical issue or condition (pharmaceutical company greed, the vaccination debate, heart disease in women, diabetes in young children, etc.)

Your topic must be approved before you begin work on your project.

Assignment Due Dates

| Assignment Part | Due Date | Number Turned In | % Turned In |
|---|---|---|---|
| Pre-writing | 10/15/2009 | 5 | 25% |
| Annotated Bibliography | 10/30/2009 | 0 | 0% |
| Thesis Statements | 11/5/2009 | 0 | 0% |
| Introduction Paragraph | 11/8/2009 | 0 | 0% |
| Peer Editing | 11/20/2009 | 0 | 0% |
| Final Draft | 12/5/2009 | 0 | 0% |

🔗 share assignment
📎 link to blackboard
👍 find a tutor

FIGURE 14

Instructor's :: New Assignments

New Assignment

You are about to create a new assignment. Assignments can be configured as simple calendar entries or be accompanied by a verified assignment box. Assignment boxes ensure that every document submitted meets your minimum formatting, citation and plagiarism criteria.

Tell us about the assignment....

Class Name *: Class - Period 4
Assignment Name *:
Due Date *:
Submission Type *: Assignment Box

Configure assignment box and template...
Document templates are used to help configure submission criteria.

Verification Criteria From: New Document Template
Show Assignment Box: Start Date        End Date
Turn In Allowed: Only Verified Next >     Cancel

FIGURE 15

Instructor's :: Automated Turn-in Verification Criteria

This assignment must adhere to the following criteria:

Content Requirements:
- Cover Page: Yes, No
- # of Sources: >, <, =
- Work Cited: Yes, No
- Bibliography: Yes, No

Length Requirements:
- Word Count: >, <, =
- Page Count: >, <, =

Plagiarism Tolerance:
Anything Goes — Reasonable Doubt — Perfect Citations

[Back] [Cancel] [Save Assignment]

Instructor's :: Student turn-in report to avoid common mistakes

PLATFORM FOR GENERATING, MANAGING AND SHARING CONTENT CLIPPINGS AND ASSOCIATED CITATIONS

CLAIM FOR PRIORITY

The present application claims priority benefit under 35 U.S.C. §119(e) to Provisional Patent Application No. 61/315,891, filed Mar. 19, 2010.

FIELD

The present application relates generally to tools for improving education, and specifically to computer systems and methods for assisting in research, collaboration, document writing, reference citation, and assignment management and evaluation.

BACKGROUND

Various types of documents (e.g., research papers, papers written by students for courses in which they are enrolled, etc.) include bibliography citations for subject matter included in the document, wherein the citations inform readers of the underlying reference sources for the included subject matter. In general, the author of such a document must write each citation.

People collaborate with each other on research topics in various ways. For example, students in courses often collaborate with one another in class or outside of class. Such collaboration may involve phone communications, email communications, text messaging, faxes, and the like. Online message boards can also provide a venue for collaboration among different people.

SUMMARY

Embodiments of the present invention provide a novel and nonobvious platform for creating and editing documents, citing source references for documented content, discovering content suitable for documents being written, collaborating with others by sharing content, discovering additional sources related to a topic, obtaining assistance (both human and non-human) in writing or editing documents, and/or managing a process of assigning document preparation projects (from either an instructor's or a student's perspective).

In one aspect, a document editing system comprises a client application and one or more computers operative to implement the client application. The client application comprises a clipping module and a document editor. The clipping module is configured to receive a user's selection of a content portion from a content source, gather information from and/or about the content source, create a bibliography citation corresponding to the content portion based on the gathered information, and store the content portion and the bibliography citation in a data storage. The document editor is configured to allow a user to edit a document and to import into the document content portions and corresponding bibliography citations from the data storage.

In another aspect, a method comprises receiving a user's selection of a content portion from a content source; gathering information from and/or about the content source; and creating a bibliography citation corresponding to the content portion, based on the gathered information. The method is performed at least partially by one or more computing devices.

In another aspect, a method comprises receiving a plurality of content portions and corresponding bibliography citations from a plurality of users via an electronic communication network, the content portions including metadata tags that describe the content portions. The received content portions and bibliography citations are stored in a data storage. A search request is received from a first user, via the communication network. The search request is responded to by searching the metadata tags of the content portions stored in the data storage, to find at least one content portion having at least one metadata tag related to the search request. The at least one content portion is sent to the first user, along with at least one bibliography citation corresponding to the at least one content portion. The method is performed at least partially by one or more computing devices.

In still another aspect, systems and methods are provided for recommending content and content sources, based on content captured by a plurality of users.

In still another aspect, systems and methods are provided to conduct plagiarism checks on documents, based on a collection of captured content and corresponding bibliography citations.

In still another aspect, systems and methods are provided to allow users to share captured content with each other.

In still another aspect, systems and methods are provided to allow instructors to manage the creation and evaluation of assignments given to students, as well as the provision of feedback to the students.

In still another aspect, an online marketplace of tutorials, collaboration tools, and helpers (e.g., tutors) is provided to help users in conducting research and preparing documents.

BRIEF DESCRIPTION OF THE DRAWINGS

FIGS. 13A and 13B show an example of at least a portion of a screen display associated with the document editing system of FIG. 1, illustrating an embodiment of a feature allowing an instructor to define and manage an assignment given to the instructor's students.

FIGS. 14 and 15 are examples of at least portions of screen displays associated with the document editing system of FIG. 1, illustrating an embodiment of a feature allowing an instructor to create and specify requirements for an assignment.

DETAILED DESCRIPTION OF THE PREFERRED EMBODIMENTS

Specific embodiments of the invention will now be described with reference to the drawings. These embodiments, and their various implementation-specific details, are set forth in order to illustrate, and not to limit, the invention.

Also, many of the figures refer to the system by using the term "Eduify." Eduify™ is an example of a product/service name.

Overview

Embodiments of the present invention provide a novel and nonobvious platform for creating and editing documents, citing source references for documented content, discovering content suitable for documents being written, collaborating with others by sharing content, discovering additional sources related to a topic, obtaining assistance (both human and non-human) in writing or editing documents, and/or managing a process of assigning document preparation projects (from either an instructor's or a student's perspective).

As used herein, a service, application, system, subsystem, component, module, tool, mechanism, or architecture can comprise software, hardware, firmware, or a combination thereof, and can be implemented by one or more computers or computer systems. Also, references to functions performed by "the system" can refer to functions performed by the document management system 10, the client application 21, and/or any other component described below. Further, methods described herein can be implemented wholly or in part by one or more computing devices. Groups of described method steps can be stored in computer storage devices as a computer program, e.g., instructions for a computer processor. Stored computer programs may comprise source code or machine language.

Figure 1:
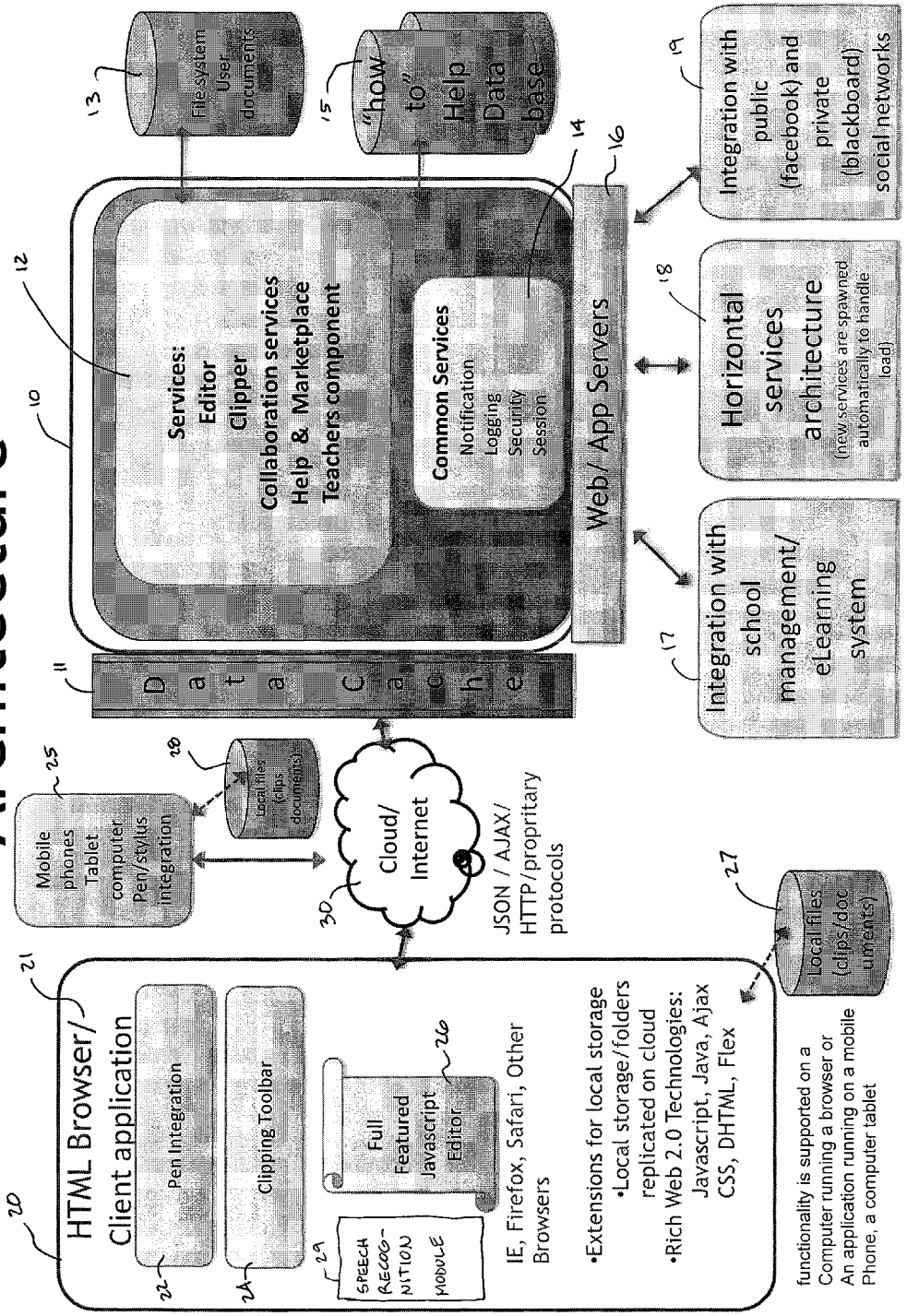
FIG. 1 illustrates the components and process flow of an embodiment of a document editing system.

FIG. 1 illustrates the components and process flow of an embodiment of a document editing system. The illustrated document editing system includes a document management system 10 and one or more client devices 20, 25 that communicate with the system 10 through an electronic communication network 30, such as the Internet. In preferred embodiments, users are free to utilize the system regardless of whether their devices 20, 25 are logged onto the document management system 10. Thus, the users' devices 20, 25 can preferably provide the functionality described herein while in a "disconnected mode." Alternatively, the users can of course use the system by logging into the system 10 with their devices 20, 25, in a "connected mode."

Document Management System

The illustrated document management system 10 can be implemented, for example, on one or more computers (e.g., servers for web communications and/or applications). In a preferred implementation, the system 10 is administered within a cloud-computing environment, as that term is understood in the art. In a cloud-computing system, the system 10 essentially leases computers 16 (e.g., servers such as web servers and/or application servers) from a third party on an as-needed basis, and then stops using them when they are no longer needed. Cloud-computing makes it possible to provide the services described herein at lower infrastructure costs, since it is not necessary to maintain a large collection of computers to meet fluctuating user needs. Horizontal services architecture 18 can be used to scale the usage of cloud computing resources (e.g., application servers) on an as-needed basis.

The document management system 10 includes services 12, such as a document editor, content clipping service, collaboration services, a marketplace of help services for students, and a teacher's component, each of which is described below. The document management system 10 further includes common services 14 typically employed for applications administered online or via cloud-computing. Such common services can include notification, logging, security, and session. Notification can refer to the ability for different components to communicate with one another. Logging is the recordation of events, whether normal or abnormal in nature (e.g., keeping records of which users are logged on). Security can include, e.g., restricting access to a user's activities, content, and documents.

The document management system 10 can include one or more data storages 13 for storing users' documents, "clips" (described below), and documents and clips shared with the user by other users. The system 10 can also include one or more data storages 15 for storing educational content, such as writing guides, links to online tutorials, and the like. Such content can of course comprise text, images, video, and combinations thereof. While the illustrated embodiment includes separate data storages 13 and 15, it will be understood that data 13 and 15 can alternatively be combined and stored within a single, data storage device.

The document management system 10 can include an eLearning module for integrating the system 10 with a learning management system (eLearning). In certain embodiments, the document management system 10 can itself also include a learning management system (LMS). The document management system 10 can also include a social networking module 19 for integrating the system 10 with public social networking services like Facebook™ and Myspace™, and/or with private social networking services like Blackboard™ and Moodle™. As explained below, the social networking module 19 can facilitate collaboration and sharing of clips, documents, other information, content sources, and research between users.

The document management system 10 can include a third party "mashup" module (not shown) that allows the document management system 10 to interact with third party services (e.g., cloud computing services such as Facebook™) to display information from both the system 10 and the third party service. A mashup is a web page or application that uses or combines data or functionality from two or more external sources to create a new service. For example, the system 10 can be configured to create a screen display for a particular user, the display showing one or more of the user's Facebook™ friends and/or the friends' feeds. The screen display may allow the user to interact with those friends in various ways described herein. The mashup module allows users to use known user interfaces to create new and richer interfaces. For instance, the mashup module can use a user's Facebook™ friends to create a new mashup with the various users' documents that are being used for a specific subject, purpose, or class. For example, an instructor might give his or her students access to course-relevant digital content such as books, documents, or other resources, which the system can display in the mashup.

The document management system 10 may include a data cache 11 for caching data expected to be more commonly used by users that log onto the system 10. Examples of cached data can include documents that the user most recently worked on, content that the user has previously "clipped" (described below), metadata from web pages of the user's recently clipped content, results of services performed on the user's documents (e.g., plagiarism check, described below), etc. Preferably, this information is copied to the data cache 11 substantially immediately when a user logs into the system 10. In certain embodiments, this information is additionally cached to the users' client devices 20, 25 (e.g., within the local data storages 27, 28).

Client Application

The document editing system includes one or more client devices 20, 25 from which a user can log onto the document management system 10 to utilize the aforementioned services 12 and access the data 13 and 15. Typically, each client device 20, 25 is used by one user (e.g., a student). However, it is certainly possible for one client device 20, 25 to be used by multiple users. In either case, it may be preferable that each user has a unique username and password for logging into the system 10, as well known in the art. The client devices 20, 25 preferably comprise personal computers adapted to run software programs, as known in the art. The client devices 20 can comprise, for example, desktop computers or notebook computers. The client devices 25 can comprise mobile computers, such as cellular phones, tablet computers, personal digital assistants, handheld document readers (such as Kindle™ from Amazon.com, or iPad™ or iPhone™ from Apple Computer), and the like. For simplicity, FIG. 1 illustrates only one client device 20 and only one mobile client device 25. However, it will be understood that any number of devices 20 and 25 can be provided. Moreover, while FIG. 1 illustrates certain features (described below) of the client application 21 on the device 20, it will be understood that these features may be provided on the mobile device 25 as well.

Preferably, each client device 20, 25 includes a client application 21, typically embodied as a software application. It will be appreciated that components of the client application 21 can run either independently on an operating system of the client device 20, 25, or alternatively within a browser for viewing content available over a computer network (e.g., HTML content available over the Internet). For example, the clipping module 24 (described below) is preferably installed directly on the client device 25, while the editor 26 (also described below) is preferably written in Javascript and preferably runs within a web browser. Client application components that are installed directly on the client device 20, 25 can still have functionality accessible via the browser (again, like preferred embodiments of the clipping module 24). In one embodiment, the client application 21 comprises a web browser tool that integrates with a commonly used web browser, such as Internet Explorer™, Firefox™, Safari™, Chrome™, or Webkit™. In this embodiment, installation of the client application 21 causes its features to be accessible in the browser, for example as a browser toolbar. A browser-independent user interface (e.g., a toolbar) of the client application 21 can be provided using Adobe Flash/Flex™. The browser toolbar can be written in C/C++, for example. In some embodiments, the client application 21 can comprise a browser plugin. In certain embodiments, features of the client application 21 can be integrated into the browser as a non-toolbar menu, such as a browser tab that invokes a script that runs in the browser to implement a particular function. In general, scripts are slower and less functional than native implementations. In yet further embodiments, the application 21 can be implemented within another software application, such as a document editing program like Microsoft Word™ or Adobe Reader™. For mobile devices 25, it may be preferable, from a performance and speed perspective, that components of the client application 21 run independently of a browser of the mobile device. For example, such components can be written in Java.

The client application 21 preferably employs rich Web 2.0 technologies, such as Javascript, Java, Ajax, CSS, DHTML, Flex, and the like. The client devices 20, 25 can communicate with the document management system 10 via the communication network 30 using any of various protocols, including JSON, AJAX, HTTP, or proprietary protocols.

This disclosure describes numerous features provided by the client application 21. It will be understood that some or all of these features can also be provided, similarly or identically, by the document management system 10. For example, the client application 21 includes a document editor 26 (described below). It will be understood that a user could alternatively access a similar or identical editor (in the services 12) running on the servers 16. For example, if the client application 21 comprises a software application that runs on a user's client device 20, 25 apart from a web browser, the user could alternatively use a web browser to access a document editor of services 12.

In the mobile device 25, the client application 21 can be configured to run on any suitable operating system, such as the operating systems for iPhone™ of Apple Computer, Windows Mobile™ of Microsoft Corporation, and Android™ from Google, Inc. The client application 21 can comprise a tool or plugin for a web browser of a mobile device 25. Alternatively, the client application 21 can be an independent application that runs on an operating system of the mobile device 25. Further, the client application 21 can be made available from an online application store, such as iTunes™ from Apple Computer. The features of the client application 21 can be provided as a native implementation in the mobile device browser, or as an independent mobile application. The client application 21 can also be configured to run on a tablet computer, either directly on the operating system or on a web browser.

The client application 21 preferably includes extensions for facilitating local storage of information 27, 28 (e.g., stored on the client device 20, 25, respectively). The locally stored data 27, 28 can comprise, for example, content copied from web pages or books, or documents that the user has created or is editing. It will be understood that some or all of this locally stored data 28 may be replicated within the document management system 10 (e.g., in data storage 13).

The client application 21 preferably includes an editor 26 for creating and editing documents. The editor 26 preferably comprises a software program having a multitude of common document creation and editing features, such as document opening and closing, text editing, formatting, templates, image inclusion and/or editing, video inclusion and/or editing, charts and tables, spell check, word count, print support, saving locally or in the document management system 10 (e.g., data storage 13), document security, and many more. In one embodiment, the client application 21 and/or editor 26 comprise a Javascript program that runs in a web browser. The editor is preferably compatible with many different document formats, such as Microsoft Office™, Portable Document Format (PDF) of Adobe Systems, HTML, Google does, TXT files, RTF files, etc.

The client application 21 can include a pen integration module 22 that allows a user to use a pen-based product (e.g., a stylus) for inputting text (e.g., words, sentences) into the editor 26. The pen integration module 26 is preferably configured to interpret the handwritten text inputted with the pen (e.g., by using known character recognition methods), transform the interpreted text into a form of text insertable into a document (e.g., ASCII text), and then allow the user to insert the text into a document and edit the inserted text if desired. The content input using the pen can also be stored as an image file, either locally (e.g., in storage 27, 28) or in the cloud (e.g., storage 13). Further, the system preferably allows users to share content or notes input using the pen with other users (see the Collaboration section below for more details on information sharing features). The client application 21 may also include a speech recognition module 29 that allows a user to input text by speaking into a microphone associated with the client device 20, 25. The voice recognition module 29 is preferably configured to interpret the spoken text (e.g., by using known speech recognition methods for converting speech into text) and then allow the user to insert the text into a document and edit the inserted text if desired. While not shown, the client application 21 can also be configured to support standard entry of text via a keyboard and mouse.

The client application 21 preferably includes a data clipping module 24 configured to allow the user to "clip" content that the user finds while browsing networked information sites (e.g., websites) or hardcopy publications. In embodiments in which the client application 21 comprises a web browser tool or plugin, the clipping module 24 can comprise a toolbar that the user employs to select and copy content from a web page, and insert the clipped content (or, more simply, the "clip") into the editor 26 (e.g., via common drag-and-drop methods). As described in further detail below, the clipping module 24 may be configured to analyze metadata on the web page from which this content is "clipped," to generate a bibliography citation for the clipped content. The clipping module 24 can be configured to format the citation in a standard format (e.g., Modern Language Association or "MLA," Chicago style, etc.), or can allow the user to select and/or customize the citation format. In certain embodiments, the clipping module 24 can allow a user to scan content from a hardcopy publication (e.g., by using a desktop or handheld scanner, or a camera integrated into a mobile client device 25) and create a bibliography citation using methods described herein. While the term "clip," as described in this paragraph, refers to content captured from a network site or hardcopy publication, a "clip" can also include content (e.g., a note) written or generated by the user.

With reference to the Collaboration section below, the system preferably allows all clips to be shared among users. This feature allows users to more easily discover new content as the users perform topical research. As described elsewhere herein, the system preferably attaches content-descriptive metadata tags to the clips, making the clips more easily searchable and relatable to each other. For example, the system can use the clip metadata to allow users to conduct searches to learn about other users who have done similar work or research, and to learn which content resources the other users found or used.

In certain embodiments, the client application 21 is configured to be used while the user is not logged into the document management system 10. In this "disconnected mode," the user can use the editor 26 to create and edit documents. Further, the user can use the clipping module 24 to clip content from web pages or hardcopy publications. Preferably, substantially all of the functionality described herein is available to a user while in the disconnected mode, including the editor 26 and clipping module 24. While in the disconnected mode, the client application 21 can be configured to store the documents and clipped content within the data storage 27, 28. Subsequently, when the user causes the client device 20, 25 to log onto the document management system 10, the client application 21 switches to a "connected mode." Preferably, while in the connected mode, the client application 21 causes the latest versions of documents stored within the data storage 27, 28 to synchronize with versions stored in the data storage 13 of the document management system 10. In some embodiments, such data synchronization occurs automatically when a user logs onto the system 10, while in other embodiments the data synchronization occurs only when prompted by the user. Such data synchronization can be implemented by using well known methods. Preferably, documents that are uploaded and synchronized with the user's files in the cloud (e.g., in data storage 13) are also stored in the data cache 11, since the user may be likely to be re-used them.

Figure 2:
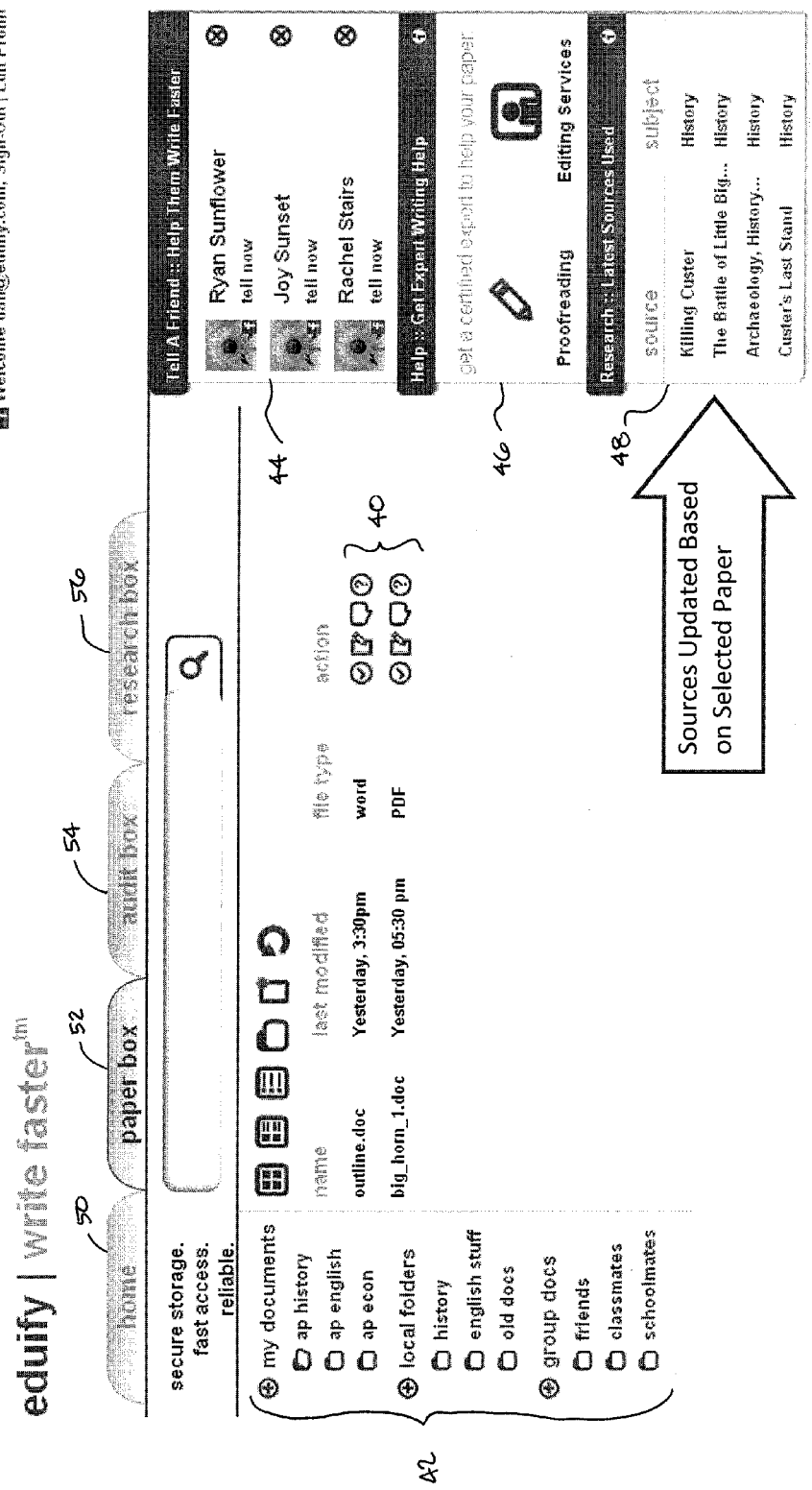
FIG. 2 is an example of at least a portion of a screen display associated with the document editing system of FIG. 1, illustrating an embodiment of a user interface for viewing a summary of user documents and content sources, and accessing collaboration and help features.

FIG. 2 is an example of at least a portion of a screen display of an embodiment of a user interface of the client application 21. The illustrated user interface includes a home page tab 50 for viewing a main or start page of the user interface, such as a top level page of a multi-tiered hierarchy of screens. A paper box tab 52 is selected in FIG. 2, which allows the user to view specific groups of documents. An audit tab allows the user to access document auditing features (described below). A research box tab 56 allows the user to access research features (which can simply be browser windows for accessing websites) that help the user to find and clip content, discover content on specific topics that other users may have used or shared, or to find additional content and content sources that may be of interest. It will be understood that the tabs 50, 52, 54, and 56 are merely illustrative, and that their corresponding features could be accessed in other ways, such as a drop-down menu.

The selected paper box tab allows the user to view a list 40 of the user's documents. The documents may be organized according to a hierarchical classification scheme 42 controlled by the user. When a particular document is selected, a list of suggested reference sources 48 is shown, which comprise source references that are related in some way to the content of the selected document. Accordingly, the client application 21 (and possibly corresponding module(s) within the document management system 10) include functionality for finding sources of content that is related to the subject matter of the document. As described herein, the system can use content-descriptive metadata tags of the clips or documents to relate clips and documents together, and to facilitate searching for related contents (e.g., search for all user clips, documents that have the metadata tag "tennis," as well as their underlying content sources). The illustrated screen display also shows a list of the user's friends (e.g., from a linked social networking site like Facebook™), which the user may wish to collaborate with. For example, the application 21 may list friends who are working on papers that are related in some way to a document (from the list 40) selected by the user. Finally, the screen display includes a section 46 with help tools, such as links for finding service providers (e.g., tutors) that will proofread or edit the user's document(s).

Figure 3:
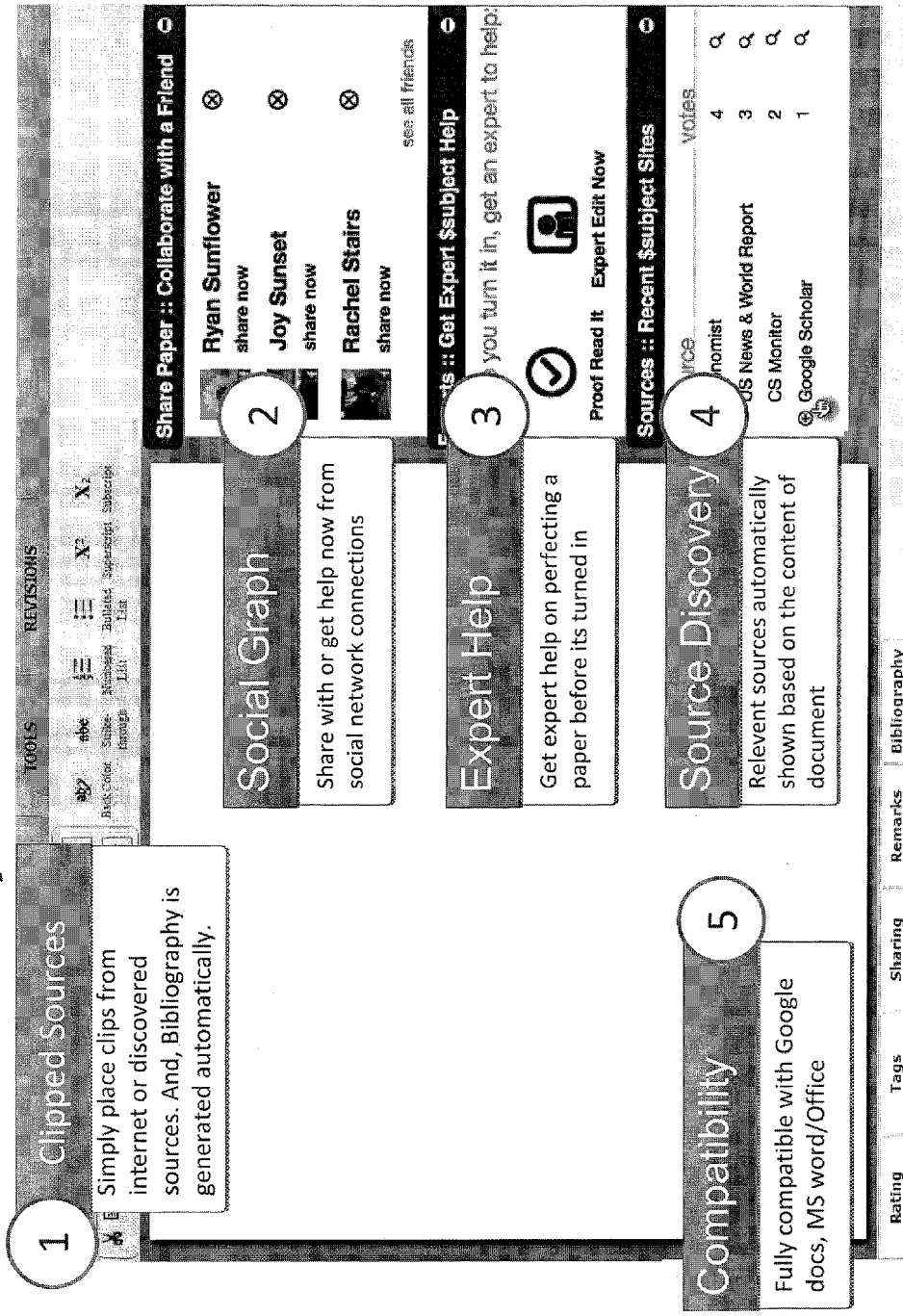
FIG. 3 is an example of at least a portion of a screen display associated with the document editing system of FIG. 1, illustrating features involving content sharing, expert help, and sources of cited content, in accordance with an embodiment.

FIG. 3 is an example of at least a portion of a screen display of an embodiment of an editor 26. The windows labeled 1-5 are editorial additions that are not shown to the user. As indicated at window 1, the editor preferably allows the user to insert content copied from a website or from a hardcopy publication (i.e., "clipped" content) into the document that is being edited. When the clipped content is so inserted, the client application 21 preferably automatically creates a bibliography citation for the inserted content. As indicated at window 2, a list of the user's friends is provided, for collaboration purposes. As indicated at window 3, the user can get writing help from experts. As indicated at window 4, the application 21 can suggest research sources for related content. As indicated at windows 5, the editor is preferably compatible with various popular document types.

In some embodiments, the document management system 10 includes a repository or store of various types of additional client applications (i.e., other than the client application 21 described above) associated with the system 10. Such additional applications can offer added value to users. Such additional applications can have very general purpose functionality. Alternatively, such additional applications can be highly focused on specific niche tasks, such as functionality related to a specific course, research topic, or class of users. In a preferred implementation, an administrator of the document management system 10 allows third party programmers to write such applications by publishing or making available a set of API's for the system 10 and/or client application 21. Such additional applications can be offered to users for a fee, or can be free.

Citation Management

As noted above, the client application 21 preferably includes a feature for "clipping" content from network sites, such as websites. For example, a user can select text, images, or video from a web page, activate the clipper feature, and then insert the selected content into the user's document. As noted above, this functionality can be provided by the clipping module 24. The clipping module 24 preferably automatically creates a bibliography citation for the inserted content. The clipper feature is preferably integrated into the user's web browser. Moreover, the client application 21 preferably keeps track of all clipped content portions (or, more simply, "clips") of a document, as well as the corresponding reference sources from which the content was clipped. The client application 21 preferably allows a user to discover clips that other users have shared with the user, relating to a specific topic.

Figure 4:
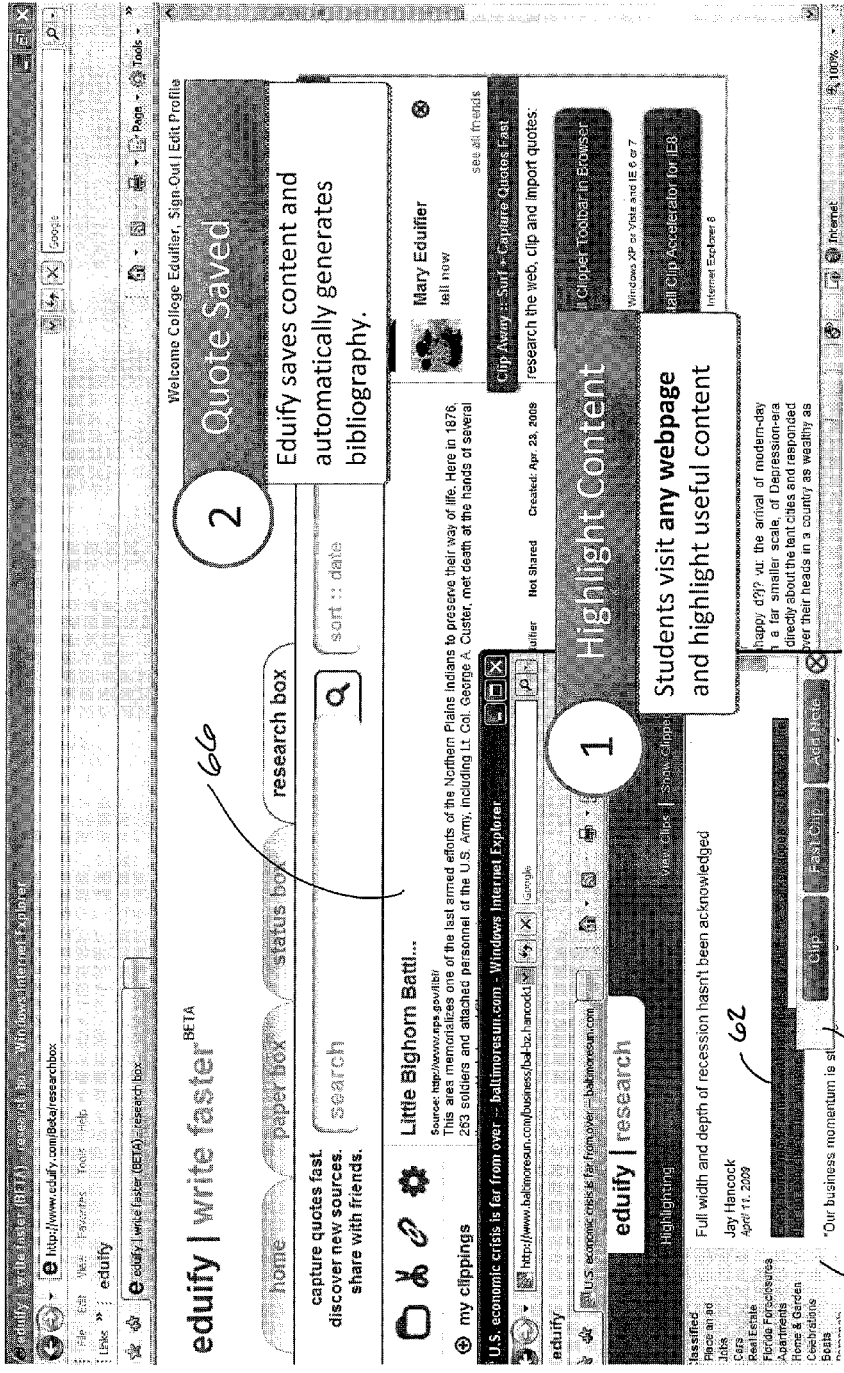
FIG. 4 is an example of at least a portion of a screen display associated with the document editing system of FIG. 1, illustrating an embodiment of a process for capturing content from a website, creating a bibliography entry or citation for the captured content, and sharing the content with other users.

FIG. 4 is an example of at least a portion of a screen display of an embodiment of a user interface associated with a process for capturing content from a website and creating a bibliography citation for the captured content. The windows labeled 1 and 2 are editorial additions that are not shown to the user. The screen display includes a web browser window 60. As indicated at window 1, a user can visit any web page and can highlight content 62. As indicated at window 2, the client application 21 is configured to save the selected content, make it available for insertion into a window 66 of the editor 26, and generate a bibliography citation for it. In the illustrated embodiment, the client application 21 provides a toolbar 64 with options for clipping the selected content. In this embodiment, the options are "Clip," "Fast Clip," and "Add Note." Clip refers to a process by which the application 21 copies the selected content and creates a bibliography citation for it, whereby the user can edit the bibliography citation. Fast Clip refers to a process by which the application automatically copies the selected content and creates a bibliography citation for it without any help from the user. Add Note is a feature that, in some embodiments, allows the user to add editorial commentary associated with the clipped content (e.g., a note specifying that the clipped content is also useful for a different paper, or a note indicating that the clipped content might be useful for one of the user's friends, etc.). In some embodiments, the Add Note feature allows a user to paraphrase researched content, such as clipped content, into the user's own words. The paraphrased content or note can still be linked to the source content.

In certain embodiments, when a user clips content from a network site or a hardcopy publication, the system is configured to inform the user about other users' clipping of the same content. For example, if a user visits a website and clips certain text, the system can be configured to generate a list of other users that clipped the same or substantially the same text. In one embodiment, the system only informs the user about other users' clipping of same or similar content when the other users are the first user's friends or contacts within an integrated social networking site. In another embodiment, the system informs the user about all other users' clipping of the same or similar content. This feature helps a user determine whether a particular source of content is useful, as evidenced by the fact that other users have clipped content from the source. The user can then do further research on the topic of interest by researching other sources that the identified users have used.

Figure 5:
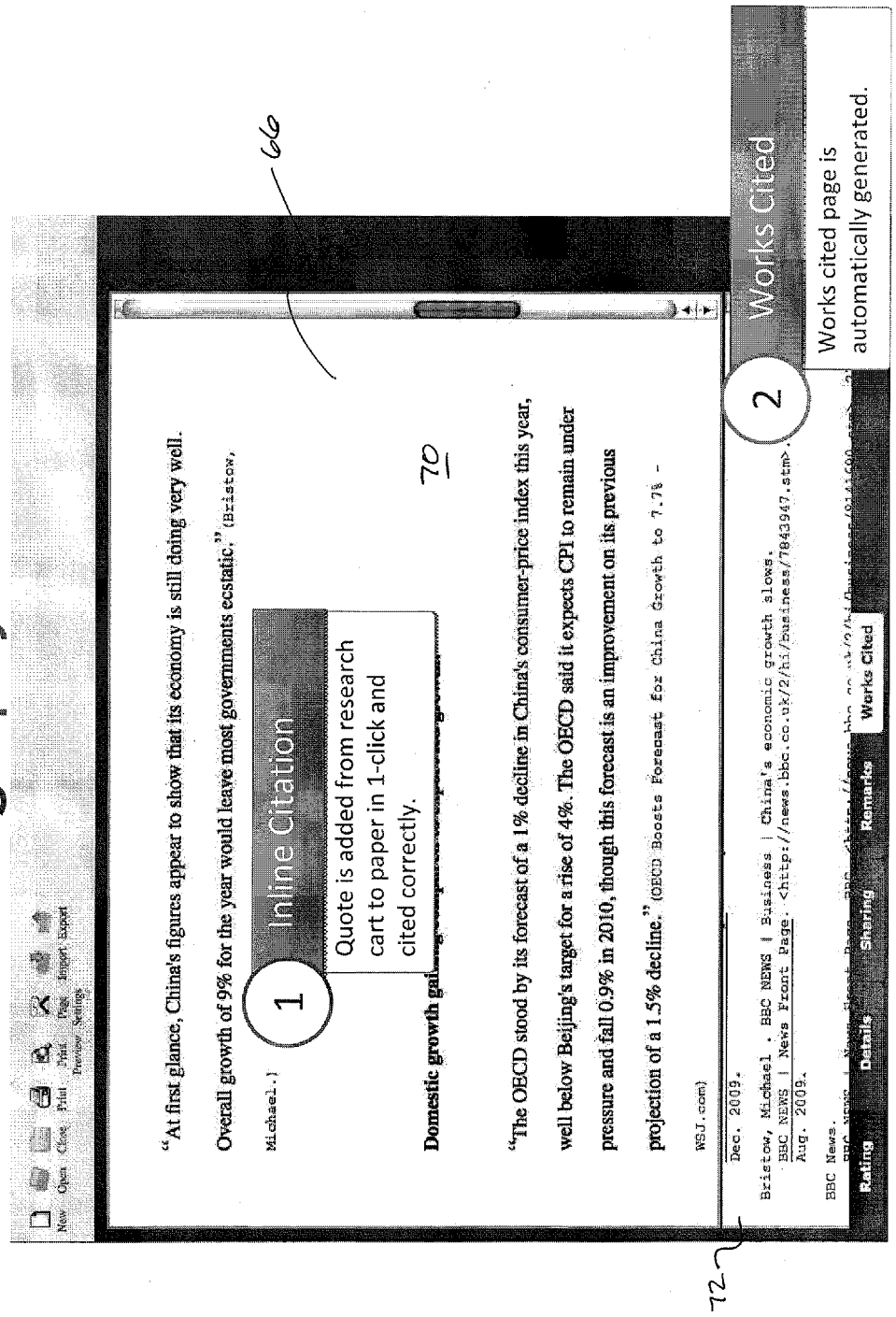
FIG. 5 is an example of at least a portion of a screen display associated with the document editing system of FIG. 1, illustrating an embodiment of a feature facilitating the insertion of bibliography citations into a document.

FIG. 5 is an example of at least a portion of a screen display of an embodiment of a window 66 of the editor 26 of the client application 21. The windows labeled 1 and 2 are editorial additions not shown to the user. The illustrated window 66 includes a document body section 70 and a bibliography section 72. As indicated at window 1, the user can insert content clipped from a reference source (such as a website as shown in FIG. 4) into the body section 70 of the editor window 66. As indicated at window 2, the clipping module 24 can be configured to respond to the insertion of clipped content into body section 70 by inserting the corresponding bibliography citation into the bibliography section 72.

Figure 6:
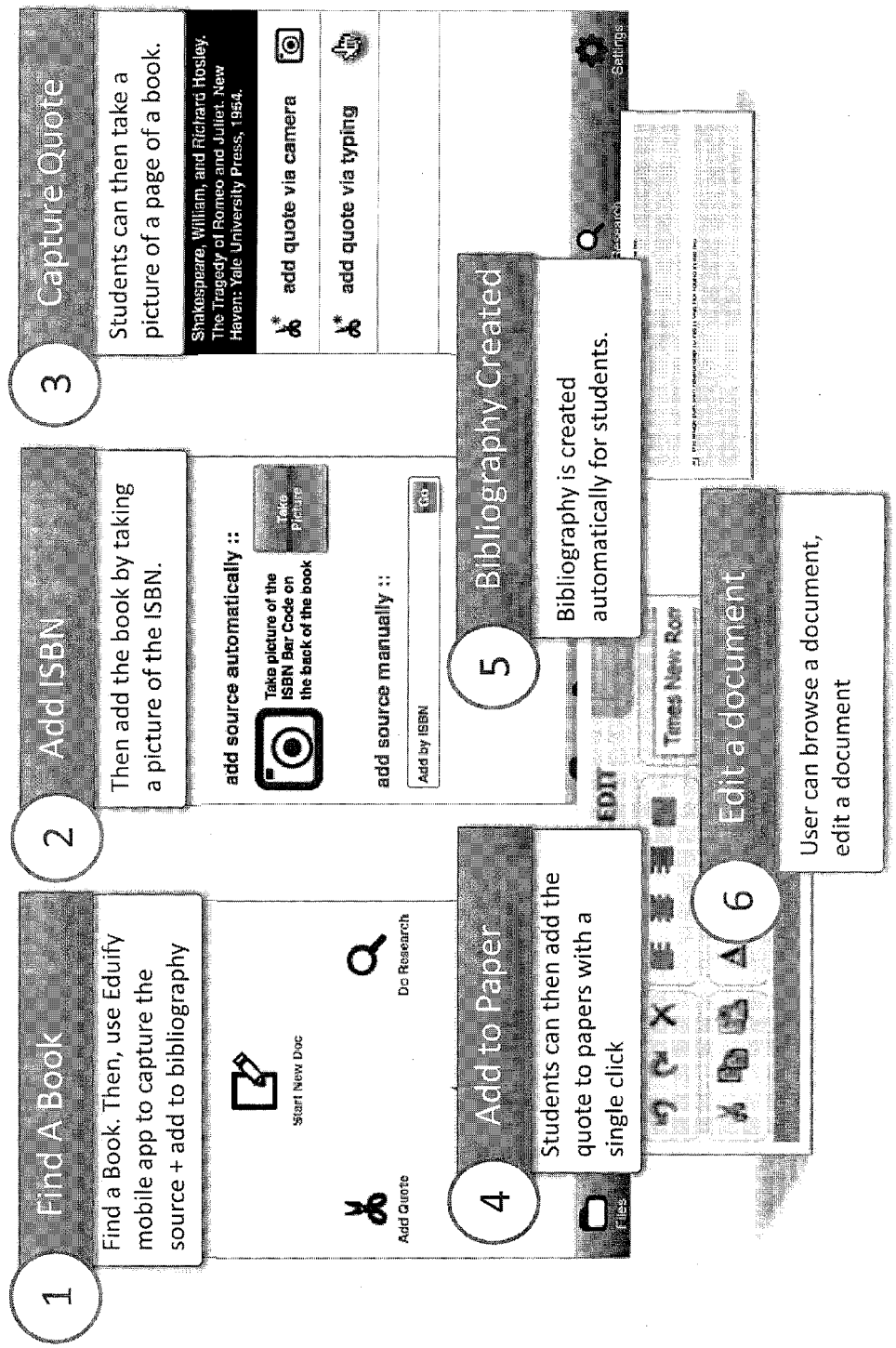
FIG. 6 includes examples of at least portions of mobile device screen displays associated with the document editing system of FIG. 1, illustrating an embodiment of a process for capturing content from a book, creating a bibliography entry or citation for the captured content, and sharing the content with other users.

FIG. 6 includes examples of at least portions of several mobile device screen displays for an embodiment of a user interface for a client application 21 running on a mobile device 25 (either within a browser or as a native application on the device's operating system). FIG. 6 illustrates an embodiment of a process for capturing content from a hardcopy publication (in this example a book). This feature is very useful because the user can capture content found when the user is away from his or her desktop or notebook computer. The windows labeled 1-6 are editorial additions not shown to the user. As illustrated, the user interface may include options for creating a new document, adding a quote (e.g., content clipped from a document), and doing research. As indicated at window 1, the user obtains a book with content sought to be clipped. As indicated at window 2, the user selects an option of identifying the book by its ISBN bar code or UPC code, and then uses a camera (e.g., a camera integrated with the mobile device 25) to take a picture of the ISBN bar code or UPC code on the book. The clipping module 24 is preferably configured to recognize the captured code and/or use it to access an online repository to look up the publication information (e.g., author name, title of the publication, publisher, publication date, etc.) of the book.

In some embodiments, the mobile device client application 21 includes components that provide additional features, such as content discovery features, access to a library of help tutorials, access to a marketplace of help providers, etc., as described elsewhere in this disclosure.

As indicated at window 3, the user can then either manually enter the content of interest (if it is text) into the mobile device 25, or simply take a picture of the content using the camera. Manual entry can be accomplished using a keyboard associated with the mobile device 25, or alternatively by a speech recognition feature of the mobile device, the client application 21, or another application. If the user opts to take a picture of the content, the clipping module 24 preferably employs an optical character recognition (OCR) feature that converts the text image into text that can be inserted into the editor 26. OCR products and methods are well known. As indicated at window 4, the clipping module 24 allows the user to add the clipped content to a document (e.g., a document in storage 28). As indicated at window 5, the clipping module 24 generates a bibliography citation for the clipped content. For example, the clipping module 24 can use the citation generation methods described above in connection with FIG. 4. In certain instances, the user may have to manually enter the page number(s) of the clipped content, if the device camera did not capture the page number(s). As indicated at window 6, the user can then edit the document with the clipped content.

In some embodiments, the client application 21 includes one or more components configured to run in response to the user capturing an image with the mobile device 25. For example, if the user takes a photo of the ISBN code, a component of the client application 21 can be configured to share the image or information obtained by automated interpretation of the image (e.g., book title, author name, etc.) with other users, such as fellow students within a class or course. As another example, a component of the client application 21 can be configured to search a database for publications or information related to the publication identified by the ISBN code (e.g., books on the same topic, books by the same author, etc.). In this manner, the system can recommend additional research sources or topics for the user. The system can also be configured to share these recommendations with other users.

While FIG. 4 illustrates a method of capturing content from a web page and creating an associated bibliography citation, it will be understood that the clipping module 24 can alternatively allow the user to capture content from other types of documents (and create associated bibliography citations), such as Microsoft Word™ documents, PDF documents, Google Docs™, and the like, using methodology described herein.

Although not illustrated in FIG. 6, the clipping module 24 can be configured to allow a user to clip content from a website accessed by a browser of the mobile device 25, in a manner similar to that illustrated above in FIG. 4.

Methodology for generating a bibliography citation is now described. When a user clips certain content from a network site, such as a web page, the clipping module 24 conducts a process of information gathering for citation generation. This process can be automatic or manual (i.e., requiring user input). The clipping module 24 can be configured to allow the user to select the type of citation generation process (i.e., automatic or manual). If the user specifies a manual process, then the clipping module 24 prompts the user to visually inspect the web page and provide information required to generate the citation.

If the user specifies an automatic process, then the clipping module 24 is configured to look for the information necessary to generate the citation, preferably by scanning the web page for key attributes needed for the citation, and/or by scanning hidden metadata associated with the web page. In certain embodiments, the clipping module 24 scans only for information necessary for generating a citation in a user-specified citation style (e.g., MLA, Chicago style), while in other embodiments the clipping module 24 scans for information used in generating a citation of any known citation style. For example, the citation may require the author name, the URL of the web page, the publication date, etc. In certain instances, this information may all be included within the metadata associated with the web page, in which case it may be relatively easy to find the information. However, it can often be a challenge to find all of the information required to generate the citation, because there is no standard or well defined way in which web page information is formatted (both in the web page itself and in the associated metadata). Preferably, the clipping module 24 is configured to scan the metadata and the web page multiple times to find the required information. In certain instances, the clipping module 24 will not find all of the required information, or will be relatively uncertain as to whether found information is accurate. In those instances, the clipping module can be configured to prompt the user for the information that was not found or for verification as to the accuracy of the found information.

The clipped content, corresponding bibliography citations, and associated metadata can also be synchronized with the user's account in the document management system 10 (e.g., stored in the data storage 13). As soon as the user clips content from a source reference, the clips and generated citations can be communicated to the document management system 10. In some instances, the user may wish to send the clips to the user's cloud storage before inserting the clips into a document. This feature is useful if the user clips content while on the go using a mobile device 25, when it may not be convenient to work on the document. If connectivity to the document management system 10 is not available, the captured clips can alternatively or also be stored within the user's local client device storage 27, 28.

Content Recommendation

Clips stored in the local storage 27, 28 or in the backend cloud storage 13 can be "enriched" with additional metadata to allow the system to index the clips and to find and recommend related clips and content sources. The additional metadata can be added automatically by the client application 21, or manually by the user. For example, the user can specify that a document or clip relates to "pulse width modulation." The client application 21 can then store clips inserted into the document with the metadata tag "pulse width modulation," and the backend system 10 can link or otherwise relate the stored clip to other clips having the same metadata tag. Thus, in a preferred embodiment, clips generally include content-descriptive metadata tags, and every user document obtains the same metadata tags when those clips are added to the document. Further, such metadata is preferably searchable. This feature allows a user to search for content that other users have shared with the searching user, and/or content that other users have contributed to the cloud storage 13 or their local storages 27, 28. For example, suppose a clip comprises the text sentence "A B C D," and that additional metadata "X Y Z" is stored with the clip in the cloud storage 13 or in a local storage 27, 28. If a user conducts a search for "B," the system will find and return the clip and/or other clips or documents (that belong to the searching user or other users) that reference "B". Also, if the user conducts a search for "Z," the system will find and return the clip and/or other clips or documents (that belong to the searching user or other users) that reference "Z". The system can also identify the content sources associated with the stored clip.

This metadata indexing feature also allows the backend system to analyze the clips in a user's document, and to generate recommendations to related source material. In other words, the system can read the metadata tags of the clips in the user's document, find other clips (e.g., clips stored in the data storage 13) that have the same or similar metadata tags, and recommend source references from said found clips. For example, the system can recommend web pages, books, magazine articles, and other publications that may be of interest to the user. Further, the system can be configured to use this method to recommend sources that are related to any documents within the user's account (in the user local storage 27, 28, or alternatively in the user's account in the cloud storage 13 if not synchronized), or related to any documents of the user's friends (from a social networking site like Facebook™) that have accounts with the document management system 10, or perhaps just those friends that have shared content with the user that receives the recommendations. Even further, the recommendations can be based simply on the content (e.g., keywords, phrases) in the documents, rather than specifically on the clips and associated bibliography citations.

This metadata indexing feature allows for the creation of taxonomies. Whenever a document is created, the client application 21 can prompt the user for the subject(s) of the document. As clips are inserted into the document, more metadata tags are associated with the document, allowing for the creation and correlation of taxonomies to facilitate improved searching and recommendation as described above.

Content Verification, Fair Use, Citation

In certain embodiments, the client application 21 can be configured to verify that unoriginal content (e.g., quotes, factual findings, etc.) included within a document is cited (i.e., that the content is attributed to its source reference). Thus, the application 21 can be configured to find content that is not, but should be, cited. For such content, the application 21 can be configured to find and recommend bibliography citations for insertion into the document, and/or to automatically insert the found citations into the document. Preferably, the client application 21 is configured to perform such content verification on documents in a variety of formats, such as Microsoft Office™, PDF documents, HTML documents, Google Docs™, TXT documents, RTF documents, and the like.

Figure 7:
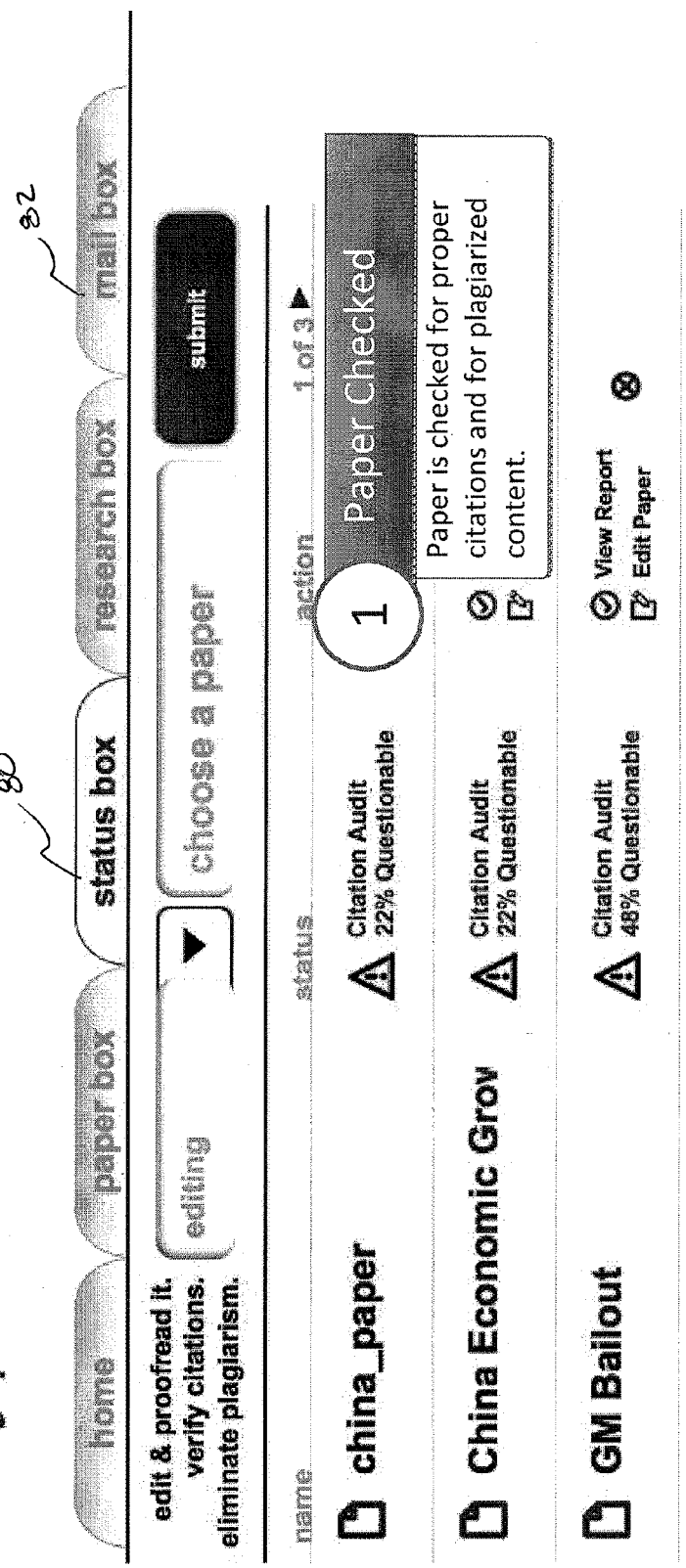
FIG. 7 is an example of at least a portion of a screen display associated with the document editing system of FIG. 1, illustrating an embodiment of a plagiarism check audit of several documents.

FIG. 7 is an example of at least a portion of a screen display of an embodiment of a user interface associated with a plagiarism check audit that the system has performed on several documents. The window labeled 1 is an editorial addition not shown to the user. In this embodiment, the illustrated information is displayed when the user clicks on a status box tab 80. As indicated by window 1, the system can be configured to conduct a plagiarism check or audit on selected documents, as well as to verify that bibliography citations are acceptably formatted. In this example, the screen display lists three documents and summaries of plagiarism checks performed thereon. The illustrated summaries provide scores reporting an extent (indicated as a percentage) to which each document contains content of questionable originality (i.e., content identified as having a higher likelihood of needing to be cited). FIG. 7 also shows a mail box tab 82 that the user can click on to view messages received from other users and/or from the document management system 10.

Figure 8:
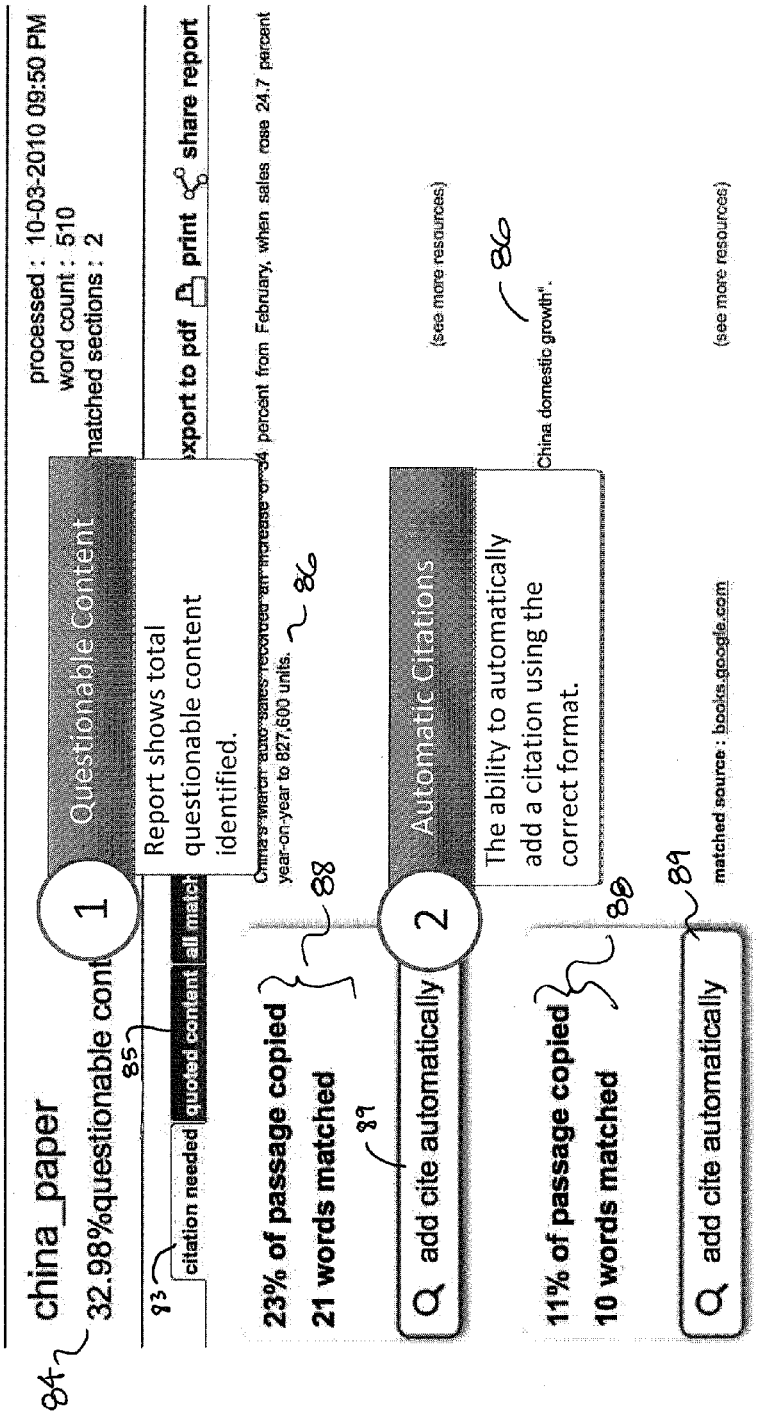
FIG. 8 is an example of at least a portion of a screen display associated with the document editing system of FIG. 1, illustrating an embodiment of a plagiarism check report for a single document, as well as a feature for automatically adding bibliography citations for plagiarized content.

FIG. 8 is an example of at least a portion of a screen display of an embodiment of a user interface associated with a plagiarism check report that the system has generated for a single document ("china_paper"). The windows labeled 1 and 2 are editorial additions not shown to the user. As indicated at window 1, the system can be configured to report a score 84 (indicated as a percentage) indicative of an extent to which the document has "questionable content," i.e., content identified as having a higher likelihood of needing to be cited. The illustrated user interface includes several tabs for viewing selected content, including a citation needed tab 83 for viewing text passages that the system identifies as needing bibliography citations, and a quoted content tab 85 for viewing content that is quoted. In FIG. 8, the citation needed tab has been selected, causing text passages 86 to be shown. The text passages 86 are those that the system has identified as needing bibliography citations. For each displayed text passage 86, a report 88 is displayed indicating a percentage and a number of words of the text passage that have been found to be copied from another source. As indicated at window 2, the illustrated user interface gives the user the option to automatically add a bibliography citation for each text passage 86, by clicking on a button 89 associated with each passage 86.

In certain embodiments, the system can be configured to dynamically enforce copyrights to clipped content. There are several ways that such copyrights can be enforced. First, if a text passage is clipped from another source and a bibliography citation is generated (e.g., as described above in connection with FIG. 4), the system can be configured to force the user to either include the bibliography citation or delete the clipped text passage. Second, if a first user shares a clip with a second user (see below section on collaboration for more details on sharing), and if the second user uses the shared clip in a document, then the system can be configured to always add the clip's bibliography citation to the second user's document. Third, if a user includes a third party's content without using the client application 21 to clip the content from the third party's document, the system can be configured to compare the user's document to a database of known content (such as other users' clips stored in the cloud storage 13) to detect the uncited usage of such content. Upon such detection, the system can be configured to force the user to either add a bibliography citation for the content or delete the content. Fourth, the system can be configured to apply fair use standards to restrict a user's inclusion of text from another source, even if the document includes a bibliography citation for the used text. In other words, if the document uses more of the source's text than is likely permissible under fair use standards, the system can be configured to force the user to either delete the content or reduce the length of the text passage copied from the source. For example, a gatekeeper may provide access to a content repository under terms that limit copying/usage of the content to less than a specified percentage of any particular book, page, text portion, etc. The system can be configured to automatically enforce compliance with such terms of access to the gatekeeper's repository.

Content Verification Algorithm

The document editing system can include a content verification (CV) module employing an algorithm for verifying textual content. An embodiment of a CV algorithm is now described with reference to FIG. 18. It will be appreciated that this embodiment is merely an example. In alternative embodiments, the algorithm need not include each of the steps described below. Further, in embodiments, the algorithm includes additional steps not described below. Also, the steps described below need not necessarily be performed in the described sequence. The CV algorithm can have one or more of various use cases, including (1) detecting content that is not, but likely should be, cited; (2) verifying that cited content is accurately cited; and (3) enforcing fair use limits on usage of cited content, in accordance with copyright principles.

In a typical embodiment, a user begins at step 202 by submitting content (e.g., a document) for a citation check, and possibly selecting one of the abovementioned use cases. In a default mode (according to certain embodiments), the CV module conducts a content verification on the entirety of the submitted content. However, the CV module and user interface can be configured to allow the user to identify a portion of the submitted content for the content verification.

Preferably, in step 204, the CV module divides the content into cited portions and uncited portions. Cited portions are text portions with corresponding bibliography citations for the sentences or paragraphs in the text. Uncited portions are text portions without any corresponding bibliography citations. The CV module can divide the content into cited and uncited portions by analyzing the bibliography citations (if any) and identifying each citation's associated text.

Preferably, the CV module saves the cited and uncited portions of the content in separate files or data structures. This facilitates running the CV algorithm separately on the cited portions and the uncited portions, which in turn makes it easier to generate separate content verification reports for the two different types of content. As indicated above, a content verification report can identify (1) properly cited content, (2) uncited content, and/or (3) whether fair use limitations have been violated. In certain embodiments, the system allows a user or an administrator of the system to adjust the fair use threshold, to vary the amount of permissible copying of third party content. As noted above, a violation of the fair use threshold means that the analyzed content contains more than the threshold amount of the source document from which the content was copied.

In one embodiment, the CV algorithm analyzes the cited portions of the content before analyzing the uncited portions. However, it will be appreciated that this order can be reversed. In either case, with reference to step 206, the CV module reads the cited or uncited portions file(s) character by character, in order to extract words. Empty ASCII characters are eliminated, and words are extracted. For example, the CV module converts "Joe Smith lives in San Francisco on Lombard Street." into "Joe" "Smith" "lives" "in" "San" "Francisco" "on" "Lombard" "Street" ".". This step allows the CV module to later perform word-by-word comparisons.

After converting the analyzed text portions into words, the CV module preferably identifies, at step 208, those words in the text portions that match a known set of commonly occurring words, such as "in," "at," "for," etc. These words in the text portions are assigned relatively low weights. The word weights can be numerical values or, alternatively, qualitative assessments (e.g., high, medium, low). Preferably, the system allows for the customization of the set of commonly occurring words.

With reference to step 210, the CV module can be configured to scan the text portions for words that are adjacent to a particular set of grammatical symbols, such as exclamation marks ("!"), commas (","), periods ("."), question marks ("?"), and the like. In some implementations, these words are assigned relatively higher or lower weights. For instance, they could all be given lower weights, or some of them could be given higher weights while others given lower weights.

The CV module can be configured to vary the weights given to words based on each word's position within a sentence. For example, a word near a beginning of a sentence might be given a higher weight than a word near the end of the sentence. In one embodiment, words that are not common words found in step 208 or words adjacent to grammatical symbols as found in step 210 are given relatively higher weights.

As indicated at step 212, on the basis of the words' weights, the CV module can be configured to discard words that have low weights. The words identified as common in step 208 or adjacent to grammatical symbols in step 210 are preferably still counted if/when the CV module determines the final percentage of words of a text portion that are matched.

Preferably, in step 214, the CV module transforms the words remaining after step 212 into "chunks." A chunk is a word count representing an arbitrarily defined minimal unit of search. In the example given above, a chunk size of nine words will create the chunk: "Joe Smith lives in San Francisco on Lombard Street" (assuming no words are discarded). It may be desirable to set the chunk size to the word count of a typical sentence. Since English sentences typically have 8-18 words, a suitable chunk size range is 8-18 words. Preferably, the system and CV module are configured to permit customizing the chunk size.

In step 216, the CV module can be configured to perform searches of one or more databases or on the Internet for the chunks. For example, the CV module can be configured to search using any available Internet search engine, such as Google™, Bing™, Yahoo™, Ask™, and the like. In some embodiments, the CV module can be configured to limit the search results returned by each search engine (and some search engines can be instructed to return more results than others). It is also possible to search private and/or proprietary databases. Each returned search result can have a corresponding database or Internet sites with a corresponding URL. In some implementations, the CV module applies a "chunk filter" that does not conduct searches for chunks that contain certain words defined in the filter.

In step 218, the CV module preferably parses the search results from step 216 to obtain the URL's of the search results. The CV module then saves the URL's into one or more files for subsequent processing.

In step 220, the CV module preferably filters out certain ones of the search results. In some implementations, the CV module has an authority filter of high-priority URL's (or network domains discernible from URL's), and it retains and/or assigns a relatively higher importance to search result URL's that match URL's or domains in the authority filter. For example, these can be URL's for websites that are trusted and known to provide highly accurate or useful information. In some implementations, the CV module has a filter of low-priority URL's (or network domains discernible from URL's), and it discards and/or assigns a relatively lower importance to search result URL's that match URL's or domains in the low-priority filter. For example, these can be URL's for non-trusted websites (e.g., adult websites with sexually explicit content).

In step 222, the CV module preferably downloads the content for the URL's not discarded in step 220. In other words, the CV module downloads the content (e.g., web page) to which the URL links. In step 224, the CV module preferably performs word extraction on the content downloaded with a URL link, in the manner described above in step 206. In step 226, the CV module preferably assigns weights to the words and/or discards certain words as described above in steps 208-212. At this point, the CV module has preprocessed both the user's content ("input content") and the content downloaded from the aforementioned database/network searching ("download content"). In other words, the CV module has broken down both the input content and the download content into a set of words with weights. At this point, the CV module is ready to apply a comparison algorithm between the input content (on a chunk-by-chunk basis) and the download content.

In step 228, the CV module preferably compares the "input content" for one of the chunks of the user's content to the "download content" corresponding to that chunk. In one embodiment, the CV module compares the input content to the download content using a well known hash code method. For example, the CV module can assign a hash code to listed words of the input content and the download content. While generating the hash code for each word, the weight of the next set of words (applying the chunk length, e.g., the next nine words if the chunk length is nine words) is also added in the hash code from its word list. Using this technique, the CV module can find matches between lists for which at least the next set of words (applying the chunk length) are matching. So, instead of conducting a word-by-word matching process, which would be computationally slow, the CV module preferably creates a hash with a numerical output for the matching.

In step 230, the CV module preferably saves all of the matched sentences in one or more files or data structures. In step 232, the CV module incrementally prepares and possibly publishes (on screen or by print) a content verification report. In this manner, the user can view matches immediately as they are detected, while the CV algorithm is still being executed on additional content. In an alternative approach, the CV module executes the algorithm on all of the user's submitted content before preparing and/or publishing the content verification report.

In step 234, the CV module preferably repeats steps 216-232 for each chunk generated in step 214. With reference to step 236, after each chunk is processed, the CV module can conduct certain finalization tasks, such as database updating, etc. Referring to step 238, assuming that the algorithm so far has been conducted on the cited portions of the user's content, the CV module preferably then repeats steps 206-236 for the uncited portions of the user's content. In an alternative embodiment, the CV module first checks the uncited portions, and then, in step 238, checks the cited portions.

In step 240, if the CV module finds a portion of uncited text that it determines should be cited, then the system can be configured to recommend or force the user to either delete the text portion, revise the text portion so that citation is not necessary (e.g., paraphrase the text portion), or add a bibliography citation for the text portion. In certain embodiments, the system can be configured to automatically delete the uncited text portion.

Figure 18:
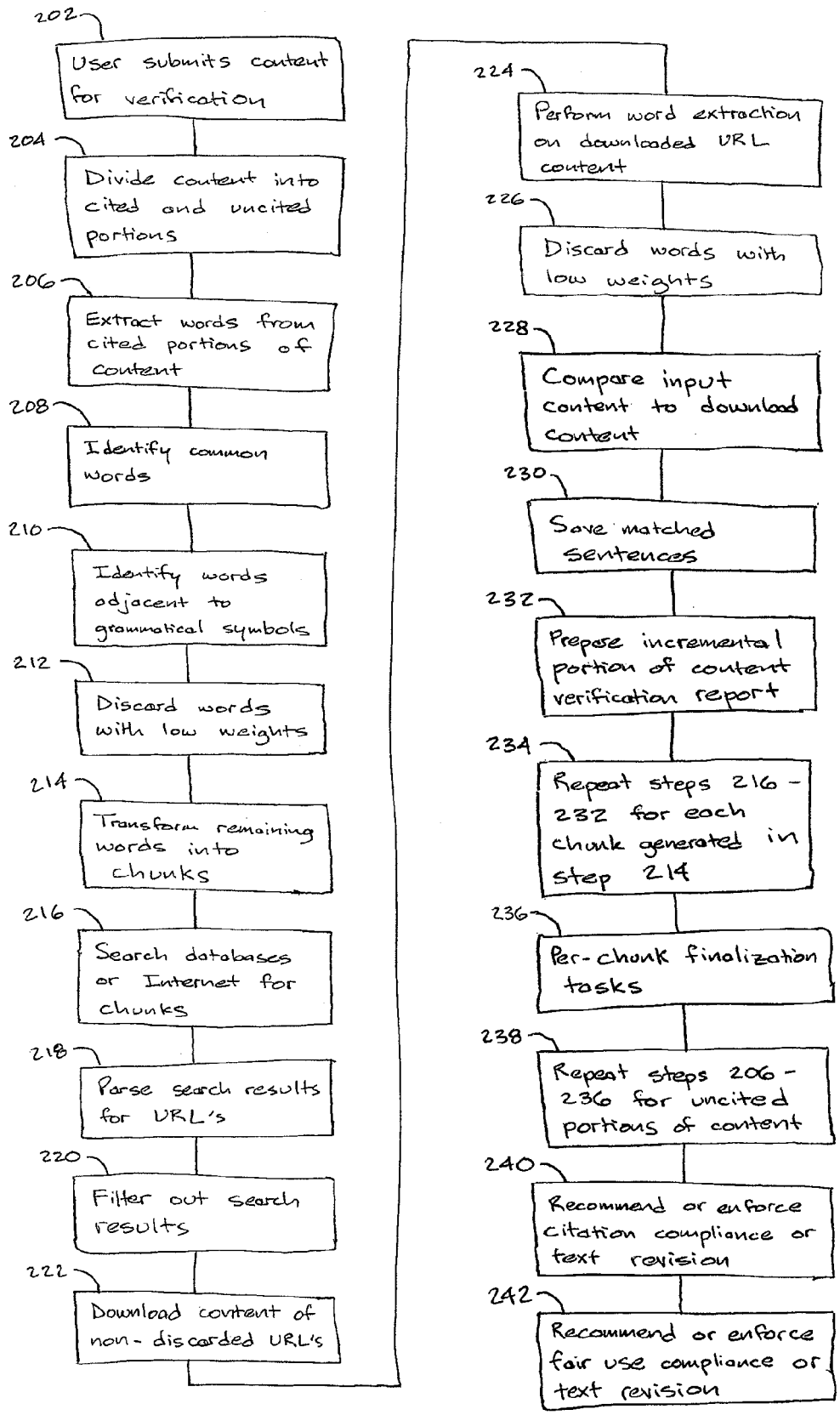
FIG. 18 is a flowchart illustrating an embodiment of a content verification algorithm.

Although not shown in FIG. 18, if the CV module discovers that a cited text portion of the user's content is incorrect, the CV module can be configured to recommend or force the user to correct the bibliography citation. Of course, the CV module can automatically generate a corrected bibliography citation for the text portion.

Referring to step 242, if the CV module determines that a portion of the user's text copies more than a fair use threshold amount of a source document, the CV module can be configured to recommend or force the user to delete some or all of the copied text.

As the CV module discovers sources for cited or uncited text portions of a user's content, the system can identify these sources to the user. This provides a methodology for recommending additional research sources to the user. For example, if a user's document discusses topic "A," the system can employ the CV algorithm to find other sources for the same topic "A."

As noted above in the Content Recommendation section, the system can also recommend content sources that other users of the document management system 10 have used for topic "A". Such other users can be users who have made their content public (i.e., available to all other users of the system 10), or simply users who are "friends" (e.g., within a social networking site linked to the system 10) of the initial user.

Collaboration

The document management system 10 can include a service 12 with functionality for allowing a user to collaborate with other users of the system, such as by sharing clipped content and documents, as well as the user's original content and/or notes. This allows for improved, contextualized learning, wherein users are permitted to see how other users have addressed similar problems. A user may wish to find what research other users have found on a particular topic. For example, a user writing a "compare and contrast" essay on topic X may use the system to find examples of "compare and contrast" essays that other users have created and/or shared, as well as other users' documents or clips relating to topic X. Further, the user may also use the system to search for help tutorials on the "compare and contrast" essay format and/or on topic X.

The client application 21 can be configured to allow a user to insert clipped content (and optionally its associated bibliography citations) into a document, an email message, an SMS text message, or another form of communication, and then send that communication to one or more other users of the system 10. In certain implementations, the user can simply drag and drop the clips into the communication. In some embodiments, the system 10 is configured to allow users to rate or rank clips received from another user, and possibly publish the ratings or rankings to a group of users. Also, the system 10 can be configured to allow users to rate or rank feedback received from other users, such as feedback on document content or research conducted. In certain embodiments, the system 10 allows multiple users to collaboratively edit and discuss (e.g., via text chat sessions or instant messaging) a document in real time. Such features allow a first user to proofread and/or edit a second user's document.

As noted above, the document management system 10 can include a social networking module 19 for integrating the system 10 with a social networking website like Facebook™, or a private learning network such as those in learning management systems like Blackboard™ or Moodle™ for a school (e.g., a college or high school). For example, the students of a course being taught at a school or other type of learning institute can be connected together via a private social network. In such implementations, the school or learning institute can designate tutors specifically for the purpose of providing help to the students, by collaborating using the tools of the document management system 10. The module 19 allows a first user to connect with other users of the system 10, who are also the first user's friends or contacts in an integrated social network, such a third party social network. In some embodiments, a user can use his or her username and/or password for the third party social network to login to the document management system 10.

Figure 9:
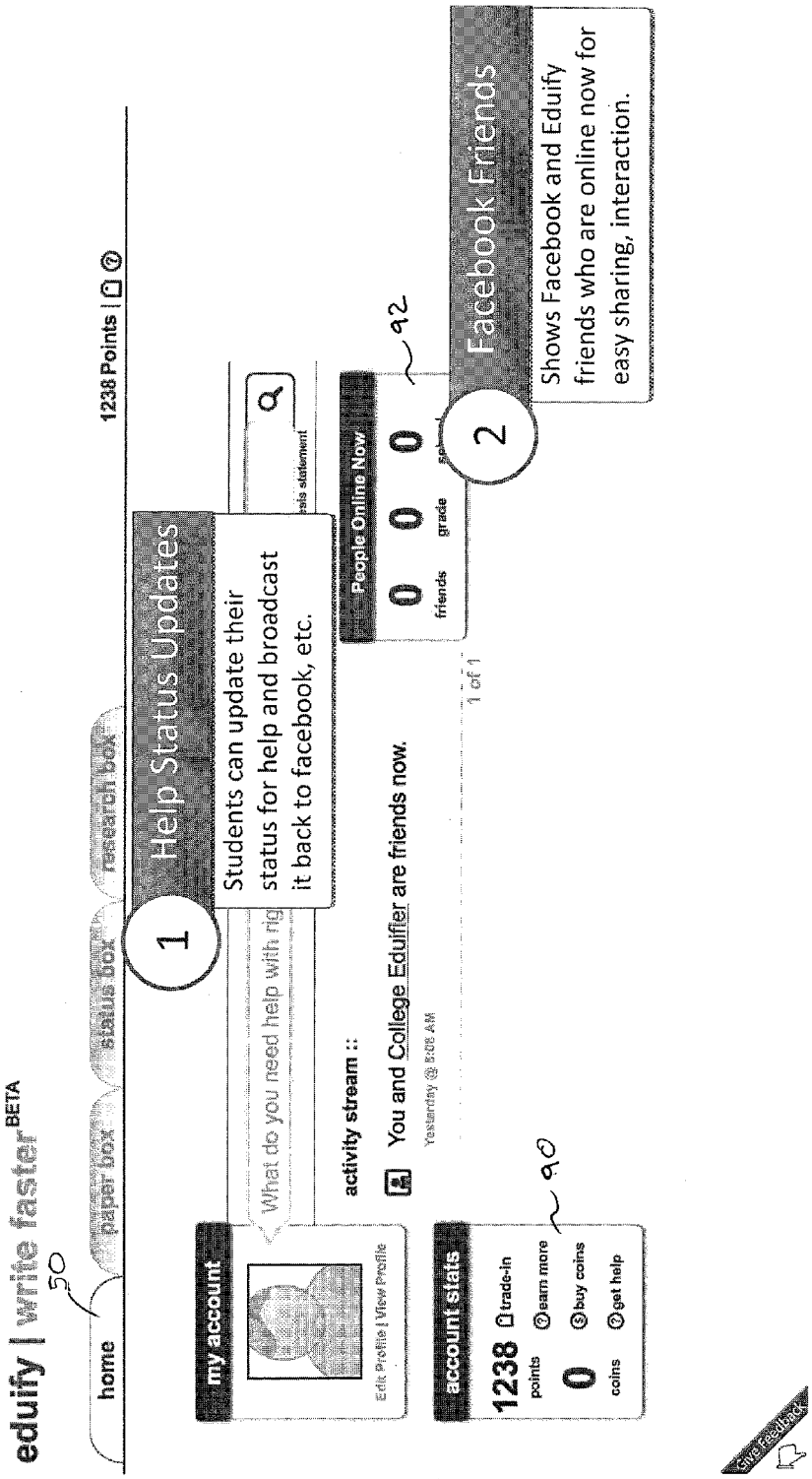
FIG. 9 is an example of at least a portion of a screen display associated with the document editing system of FIG. 1, illustrating an embodiment permitting integration of the system with users' social networking accounts.

FIG. 9 is an example of at least a portion of a screen display of an embodiment of a user interface for connecting a user with the user's friends or contacts within a social networking website (in the illustrated embodiment, Facebook™). In the illustrated embodiment, the displayed subject matter is shown when the user clicks on the home tab 50. The windows 1 and 2 are editorial additions not shown to the user. As indicated at window 1, the client application 21 can include an input field that allows a user to edit the user's current status. In this context, the user's status can be a free-form description, as is used in various social networks. Alternatively, the user's status can be regulated to have a certain format. The user can user the status update to broadcast the user's need for help or collaboration on a particular document or documents. The status update is then broadcast to other users of the document management system 10, or more broadly to all of the user's friends or contacts in the integrated social network. For example, the status update can simply be broadcast to all of the user's Facebook™ friends. As indicated at window 2, the client application 21 can be configured to display a window 92 with all of the user's friends from the integrated social network (e.g., the user's Facebook™ friends, or fellow students or coworkers in a private network associated with a class or employer) that are currently logged onto the document management system 10 and potentially available for real time interaction, collaboration, document sharing, help, etc.

The client application 21 can allow the user to contact and communicate with the other users via any suitable method, such as email, SMS text messages, chat sessions, and the like. In certain embodiments, the system can facilitate the sharing of documents or clips with another user (e.g., friends, classmates, teachers, marketplace help providers) by electronically sending a link to the shared content to the other user. This allows the recipient to download and view the content from a client device 20 or mobile client device 25 simply by activating the link. In those instances in which the user only desires to share access to certain clips or portions of a document, the system can be configured to facilitate the creation of links solely to shoe clips or document portions. This allows the recipient to view these specific clips or document portions without downloading the entire document. Embodiments allow a user to share any and all content created by the user, such as documents, clips, and feedback, with a user's network of contacts or friends within a social network.

In certain embodiments, when a user provides feedback on other users' documents or research, the system awards reward points to the feedback-providing user. In some embodiments, these reward points can be redeemed for prizes, such as gift cards and other valuables. In FIG. 9, the user's accumulated reward points are shown in a window 90. The system can also cause users that provide feedback, assistance, or other help to earn reputational badges or classifications based on ratings given by recipients of such feedback, assistance or help.

Help & Marketplace

The document management system 10 can provide users with both automated resources as well as human resources for help in the users' projects. Both types of resources are now described.

The document management system 10 can include a service 12 for providing semi- or fully-automated resources that help users to write documents, perform research, and related tasks. The system 10 can include a library of computer-accessible help tutorials that address various aspects of writing, style, grammar, etc. These tutorials preferably include numerous examples to help students write their documents. It will be understood that such tutorials can include text, audio, and/or video to maximize their effectiveness in helping users to improve their writing skills. For example, the tutorials can be formatted as "how to" guides, such as a guide explaining how to write a thesis statement. The document management system 10 preferably includes a query interface for searching the library of help tutorials, to assist users in searching and finding tutorials of interest. In certain embodiments, users (such as the marketplace "providers" described below) can also create new tutorials, upload them to the system 10, and share them with some or all of the other users of the system 10. However, it may be preferable to require that newly created help tutorials be approved by writing or subject matter experts.

Figure 10:
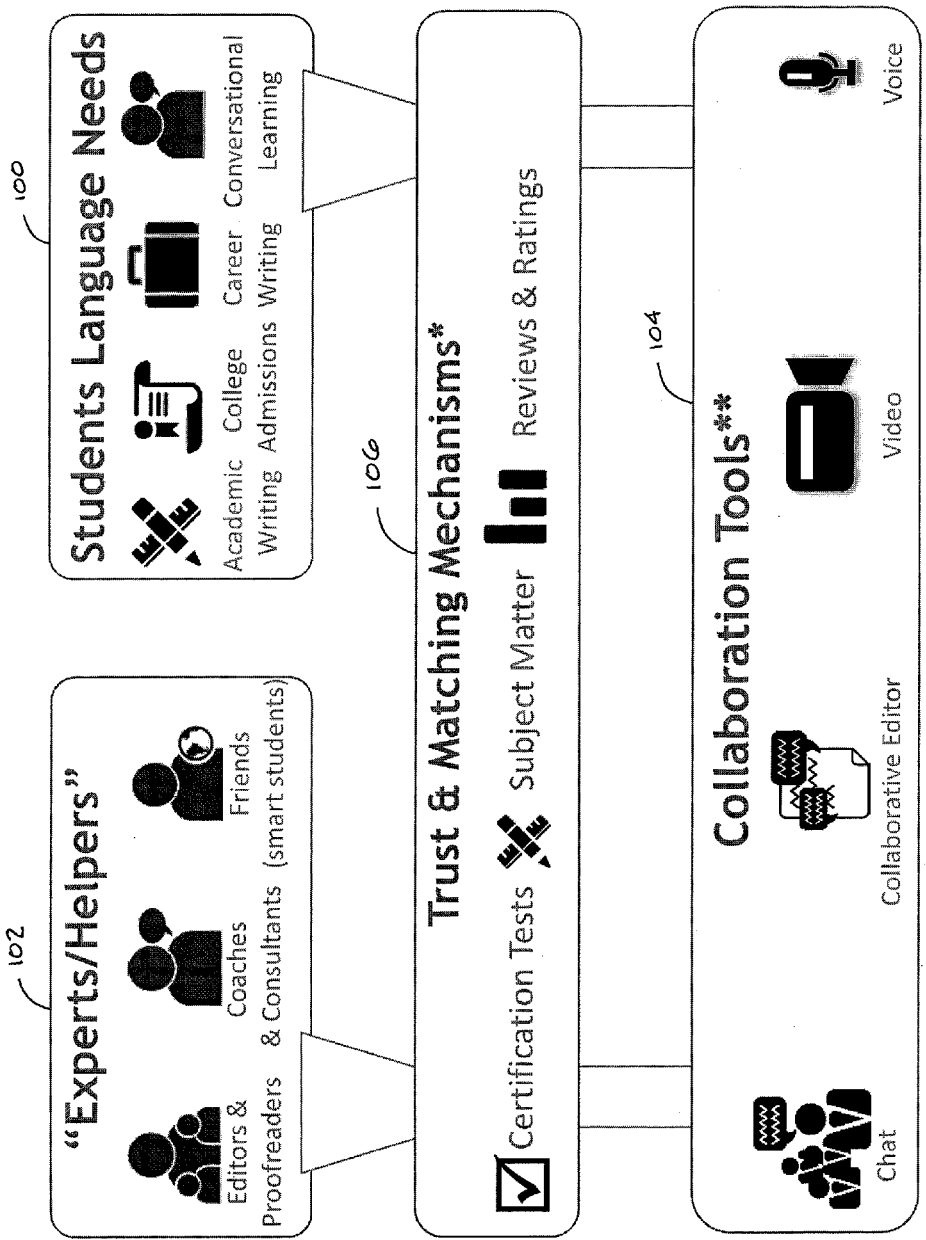
FIG. 10 illustrates the components and process flow of an embodiment of a marketplace of students, experts, and collaboration tools accessible over an electronic communication network.

In some embodiments, the document management system 10 includes a service 12 that allows users to obtain assistance from a marketplace of help "providers," such as subject matter experts, tutors and the like. FIG. 10 illustrates the components and process flow of an embodiment of a marketplace of users 100 (illustrated as "students"), help providers 102 ("experts/helpers"), and collaboration tools 104 accessible over an electronic communication network. The help providers 102 can comprise, for example, document editors and proofreaders, subject matter coaches and consultants, or a user's friends (such as a smart student taking the same course). The users 100 can use the marketplace for help in any of a wide variety of areas, such as academic writing, college admissions applications or essays, resumes and cover letters for prospective employers, career/technical/professional writing, language skills (e.g., learning conversational English), general learning, and the like.

In certain embodiments, the system allows the help providers 102 to access the help tutorials described above, and to recommend specific tutorials to users as per the provider's discretion. Further, the system can even be configured to allow a help provider 102 to customize, annotate, or supplement a specific tutorial for a given user. For example, if the help provider 102 wants to recommend a tutorial on writing thesis statements for a specific user 100 working on a paper relating to pulse width modulation, the provider can send the user a link to the tutorial on writing thesis statements, along with additional materials or annotations relating to pulse width modulation.

The marketplace can provide one or more of a variety of different types of tools 104 for collaborating over an electronic communication network, such as email, instant messaging, a chat session platform, a document editor 26 that both the user 100 and the provider 102 can access simultaneously in real time, a video conferencing platform, a voice conferencing platform (e.g., voice over IP), a tool (e.g., WebEx™) for simultaneous viewing of either participant's computer screen, and the like.

In certain embodiments, the marketplace includes automated or semi-automated trust and matching modules or mechanisms 106 for helping a user 100 find a suitable help provider 102 for a particular project, such as a writing assignment or research project. A primary trust mechanism 106 can involve a certification process for approving or rejecting a help provider 102 based on a review of his or her qualifications. Help providers 102 can be selected and certified for inclusion in the marketplace based on their subject matter experience, tutorial experience, educational level, and other qualifications. Preferably, the system is flexible enough to allow a provider 102 to effectively extend his or her certified expertise to additional areas as the provider's qualifications improve. For example, if an existing provider 102 obtains a degree in finance, the provider could then apply to add finance to his or her areas of certified expertise, which application can then be reviewed and either approved or rejected by the system 10.

Another trust mechanism 106 can involve user ratings, rankings, and reviews of the help provider 102. As each help provider 102 completes help projects for users 100, the document management system 10 can provide each user 100 with an opportunity to rate or rank the provider's performance or assistance given to the user. The system 10 can be adapted to use such rankings or ratings (which can be numerical) to determine on an ongoing basis whether to continue permitting the help provider 102 to provide help services within the marketplace. For example, if the provider's average or median rating drops below a defined threshold for a given period of time, the system 10 can revoke the provider's ability to provide help services to users 100 within the marketplace. Further, the user's reviews of the help provider 102 (e.g., textual evaluations of the quality of the provider's help) can be used to determine, on an ongoing basis, whether the provider's ability to provide help services within the marketplace should be revoked.

Moreover, a help provider's qualifications, user ratings, rankings, and reviews can be broken down into different categories. For example, a specific help provider 102 can have high qualification and user rating scores in proofreading and editing, while having low scores in project research. Breaking down the scores into categories can facilitate better matching of user's help requests to suitable help providers 102. In the aforementioned example, the provider 102 might be a good candidate for a user requesting proofreading help, and might simultaneously be a bad candidate for a user requesting help in researching a specific topic.

Automated or semi-automated mechanisms 106 for matching a user 100 with a help provider 102 can consider various matching criteria. For example, a matching module 106 can search for help providers 102 who are currently logged onto the system 10 or who have otherwise communicated their current availability to provide help (even though they may not be currently logged on). A matching module 106 can also search for help providers 102 whose qualifications and/or ratings match a user's needs specified in various categories. For example, a user 100 can submit a search request for a help provider 102 who is proficient in writing and economics, who has a user feedback rating of at least four stars, and who is willing to have a 30 minute conversation with the requesting user (perhaps currently or anytime within a specified time period, e.g., in the next 24 hours). The system can be configured to allow a user 100 to search based on the language capabilities of the help provider 102 (e.g., the user may search for a provider 102 who has a specified proficiency in conversational Spanish). It will be appreciated that a user 100 can specify any of various conditions in his or her search request. Further, a user 100 can limit the search to help providers 102 who are currently available to help or who can complete a help request within a specified time period ("turnaround time").

Figure 11:
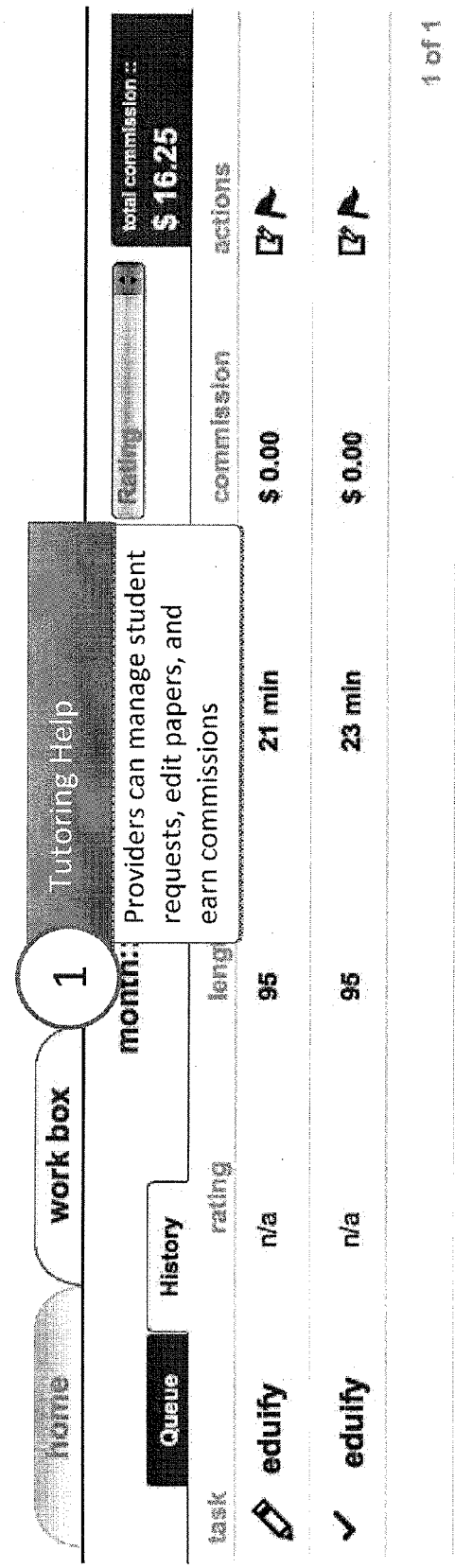
FIG. 11 is an example of at least a portion of a screen display associated with the document editing system of FIG. 1, illustrating an embodiment of a feature allowing a tutor or "provider" to view the status of received tutoring projects.

FIG. 11 is an example of at least a portion of a screen display of an embodiment of a user interface for a provider's active tutoring projects for other users. The window labeled 1 is an editorial addition not shown to the user. As indicated at window 1, the provider can use the user interface to manage user's (e.g., student's) help requests, fulfill those requests, and earn commissions. For example, providers 102 can be paid money by an administrator of the document management system 10, or alternatively directly by the requesting users. Alternatively or additionally, providers can earn reward points when they fulfill help requests, which points can be redeemed for money, prizes, or other valuables.

Figure 12:
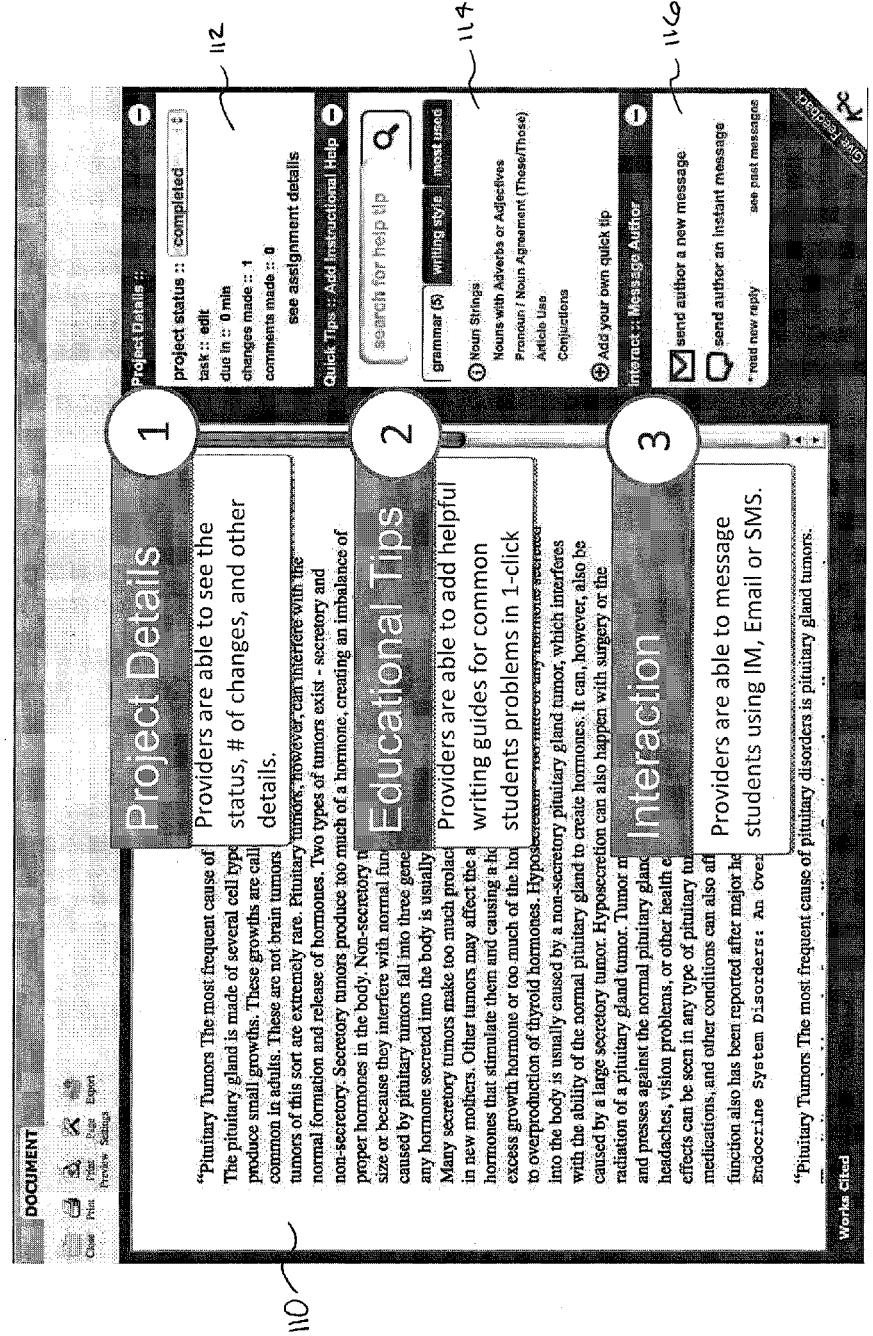
FIG. 12 is an example of at least a portion of a screen display associated with the document editing system of FIG. 1, illustrating features allowing a tutor or "provider" to view project details, recommend online tutorials or writing guides, and interact with a student, in accordance with one embodiment.

FIG. 12 is an example of at least a portion of a screen display of an embodiment of a user interface that allows a help provider 102 to fulfill a help request from a user 100. The windows labeled 1-3 are editorial additions not shown to the user 100. The user interface can comprise a document editor 26 (FIG. 1) or a specialized interface specifically for help providers 102. The illustrated user interface includes a content window 110 for displaying the user's document or written content. As indicated at window 1, a project status window 112 provides a summary of certain details about the help project, such as the type of task to be done, when it is due, the number of changes that the provider 102 has made to the content, and the number of comments that the provider has inserted or given. As indicated at window 2, an instructional help window 114 provides a summary of help tutorials that the provider 102 has linked to the project, as well as other notes or annotations given by the provider. As indicated at window 3, an interaction window 116 provides options for the provider 102 to communicate with the user 100, such as by sending an email message, an instant message, other forms of communication described herein, or any other suitable form of communication (including both real-time and delayed communications).

Instructor's Module

In certain embodiments, a service 12 of the document management system 10 comprises an instructor's module 12 for allowing an instructor or teacher to manage the creation and evaluation of assignments given to students, and to manage the provision of feedback to the students. Preferably, the instructor and the students are users of the system 10.

Figure 13B:
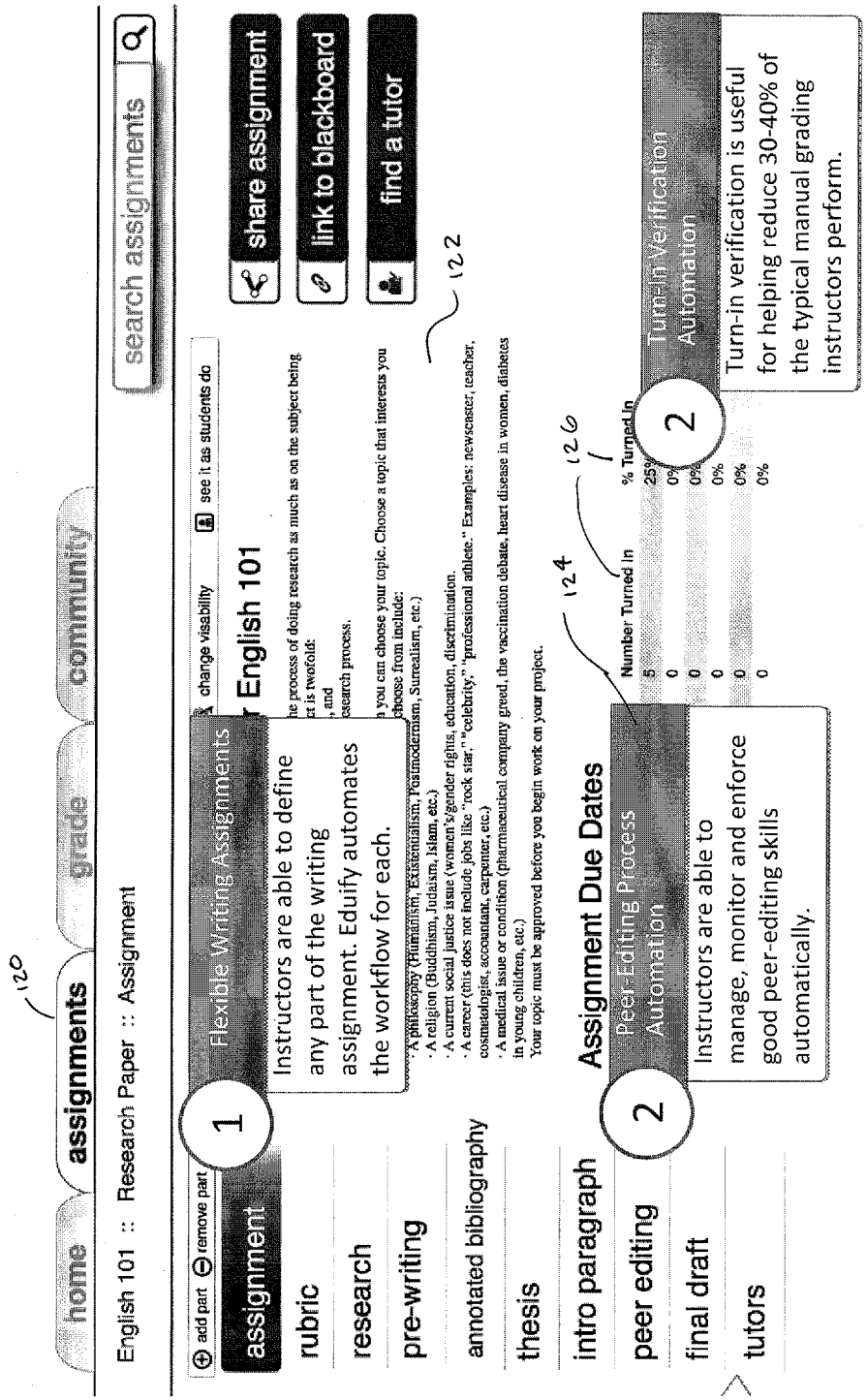

FIGS. 13A and 13B show an example of at least a portion of a screen display of an embodiment of a user interface allowing an instructor to manage assignments given to the instructor's students. In FIG. 13B, the windows labeled 1-3 are editorial additions not shown to the user. The illustrated screen display includes an assignments tab 120, selected in FIGS. 13A and 13B, which provides a summary of assignments and associated details for a given course (in this case, "English 101"). In this example, the screen summarizes details for assignments associated with a research paper. As indicated at window 1 of FIG. 13B, the illustrated user interface includes an assignment description field 124 within which the instructor can define a specific document writing assignment. As indicated at window 2 of FIG. 13B, the user interface includes a list 124 of task deadlines associated with the assignment. As indicated at window 3 of FIG. 13B, the list 124 can include columns 126 specifying the number and percentage of students who fulfilled each task in the list.

FIGS. 14 and 15 are examples of at least portions of screen displays of an embodiment of a user interface allowing an instructor to create and/or specify requirements for an assignment. The user interface illustrated in FIG. 14 allows the instructor to specify the class name, assignment name, due date, mode of submission (in this case, the instructor has specified that students must submit their papers to the instructor's "assignment box"), verification criteria (e.g., referencing a template of document format and content requirements), a date range within which the assignment will be viewable online by students, and an indication of whether assignments must comply with the verification criteria in order to be submitted by students.

The user interface illustrated in FIG. 15 includes a content requirements box 130, a length requirements box 132, and a plagiarism tolerance box 134. In this embodiment, the content requirements box 130 allows the instructor to specify whether a cover page is required, the number of bibliography sources required, whether bibliography citations are required for content obtained from other sources, and whether a bibliography is required. In this embodiment, the length requirements box 132 allows the instructor to specify restrictions on word count and page count. The plagiarism tolerance box 134 allows the instructor to specify his or her tolerance for plagiarized content. In this embodiment, the plagiarism tolerance box 134 comprises a slider that allows the instructor to specify his or her plagiarism tolerance on a sliding scale. It will be appreciated that the user interface can be configured to allow the instructor to specify a different set of requirements than those shown in FIGS. 14 and 15.

Figure 16:
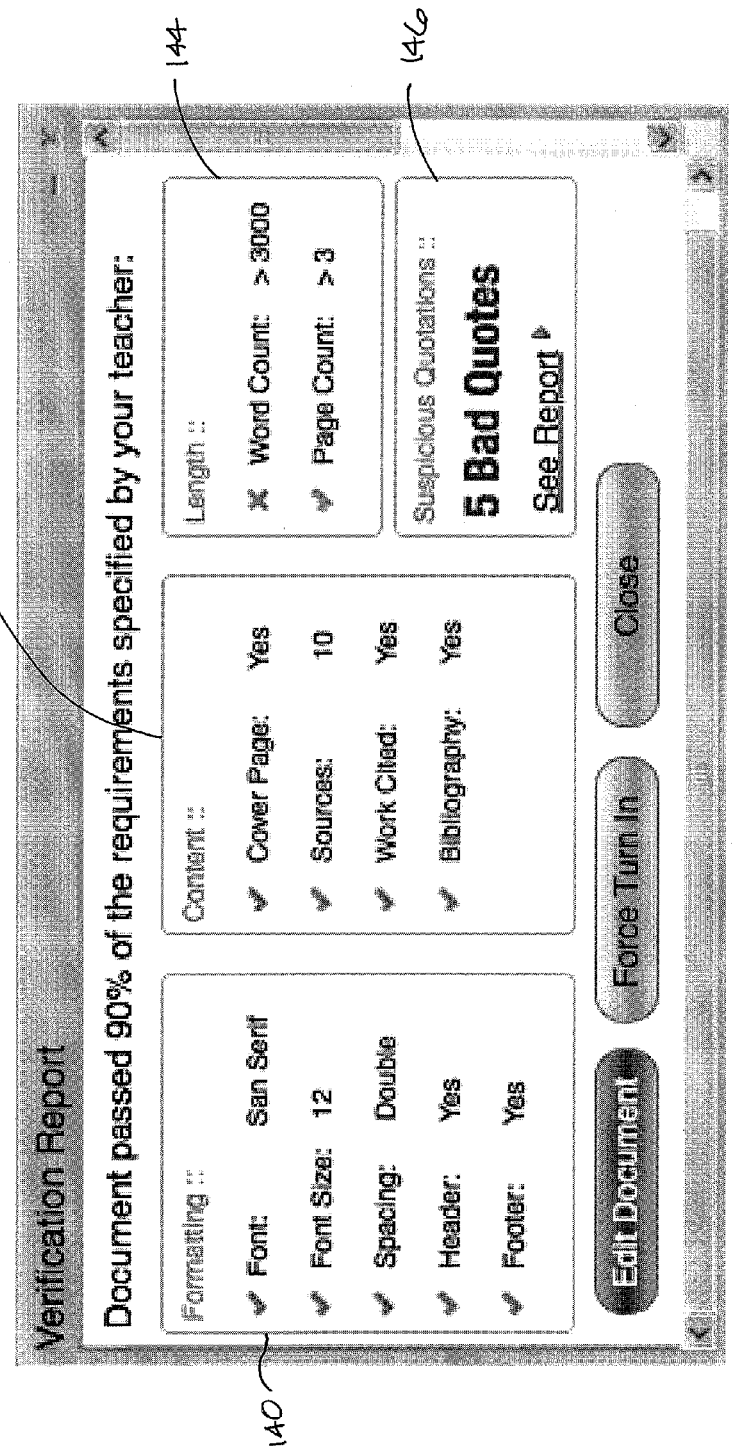
FIG. 16 is an example of at least a portion of a screen display associated with the document editing system of FIG. 1, illustrating an embodiment of a report automatically generated for an instructor when a student submits a document in satisfaction of an assignment.

FIG. 16 is an example of at least a portion of a screen display of an embodiment of a user interface providing a report that the system can automatically generate for an instructor when a student submits a document in satisfaction of an assignment. The illustrated "verification report" includes a formatting box 140, a content box 142, a length box 144, and suspicious quotations box 146. The verification report can reduce the amount of time that an instructor spends grading student papers, by automating the process of checking for satisfaction of format, content, length, and bibliography requirements. The formatting box 140 reports whether the student's document satisfies format requirements for the assignment, such as the required font, font size, line spacing, header requirements, and footer requirements. The content box 142 reports whether the student's document satisfies content requirements for the assignment, such as whether it has a cover page, whether it includes content from a required number of content sources, whether the used content from other sources is cited, and whether a bibliography is included. The length box 144 reports whether the student's document satisfies length requirements for the assignment, such as word count and page count restrictions.

In some embodiments, the suspicious quotations box 146 reports whether the student's document contains content that likely should be cited but is not. The system can be configured to generate the information provided in box 146 (or, in this case, in a report shown when the instructor clicks on the link in box 146) by conducting a plagiarism check on the document, as described elsewhere herein. In some embodiments, the suspicious quotations box 146 reports whether the system has detected improperly formed bibliography citations.

In certain embodiments, the system allows a student to access a verification report as shown in FIG. 16 prior to submitting the student's paper to the instructor. This allows the student to correct any mistakes noted on the report prior to submission. In certain embodiments, the instructor can restrict submission of the students' papers until such errors are corrected.

Once a student submits a paper in satisfaction of an assignment, the system preferably allows the instructor to evaluate and record feedback on the paper, for the benefit of the student. For example, the system can allow the instructor to provide written feedback, in the form of comments inserted the student's paper, or a separate feedback report. The feedback can alternatively comprise audio data (e.g., the instructor's recorded speech) or links to selected ones of the help tutorials described above (e.g., via a drag and drop interface). The availability of help tutorials can further reduce the amount of time an instructor spends grading papers, by providing readily usable tips and tutorials that the instructor does not need to recreate for each student.

Figure 17:
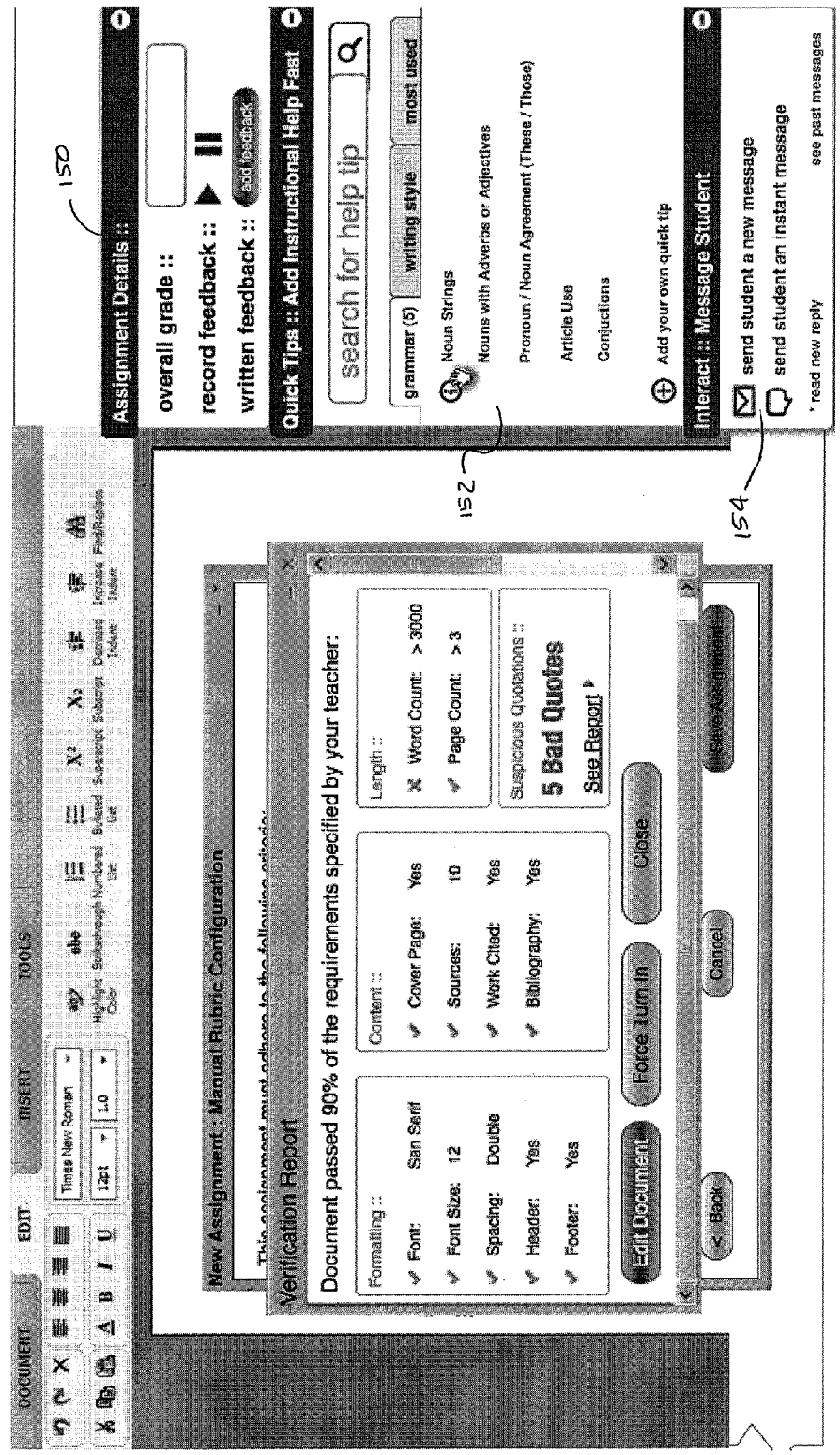
FIG. 17 is an example of at least a portion of a screen display associated with the document editing system of FIG. 1, illustrating an embodiment of an evaluation and feedback page for a student's assignment.

FIG. 17 is an example of at least a portion of a screen display of an embodiment of a user interface for an instructor to evaluate and provide feedback on a student's paper submitted in satisfaction of an assignment. The illustrated user interface includes the verification report of FIG. 16, an assignment details box 150, an instructional help box 152, and an interaction box 154. The assignment details box 150 reports details (or provides links to same) on the instructor's feedback on a given student's paper, such as the overall grade given, audio feedback (which the system can record when the instructor speaks into a microphone associated with the instructor's client application 20, 25), and written feedback that the instructor provides. The instructional help box 152 lists help tutorials that the instructor has recommended for the student, as well as notes, tips, or annotations that the instructor provides. The interaction box 154 provides options for the instructor to communicate with the student, such as by sending an email message, an instant message, other forms of communication described herein, or any other suitable form of communication.

In certain embodiments, when an instructor provides feedback and/or grades to a student, the system is configured to automatically send that feedback and/or grades to other databases or systems for processing. For example, if an instructor inputs a final course grade for a student using the instructor's client application 21, the grade can be automatically sent to a computer system for an administration of the school or university that provides the instructor's course. In this example, the grade can be automatically provided for publication in an administration-generated report card or grade point average calculation.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Further, the various features of this invention can be used alone, or in combination with other features of this invention other than as expressly described above. Thus, it is intended that the scope of the present invention herein disclosed should not be limited by the particular disclosed embodiments described above.

What is claimed is:

1. A method of enabling users to share and locate content clippings, the method comprising:

receiving, via an electronic communication network, a plurality of content portions and corresponding bibliography citations from clipping modules that run on user computing devices of a plurality of users, the content portions including metadata tags that describe the content portions, said metadata tags including user-generated metadata tags entered by users using a user interface of the clipping modules;

storing the received content portions and bibliography citations in data storage;

receiving a search request from a user computing device of a first user, via the communication network;

responding to the search request by searching the metadata tags of the content portions stored in the data storage, to find at least one content portion having at least one metadata tag related to the search request; and sending the at least one content portion to the user computing device of the first user, along with at least one bibliography citation corresponding to the at least one content portion;

whereby the method enables users to conduct searches for content portions uploaded to the data storage from computing devices of other users;

wherein the method is performed by one or more computing devices of a network-accessible system.

2. The method of claim 1, wherein the metadata tags additionally include auto-generated metadata tags generated by the clipping modules.

3. The method of claim 1, wherein the content portions include user-selected clips of web pages, and the bibliographic citations include auto-generated citations generated at least partly by automatically scanning the web pages for attributes to include in the citations.

4. The method of claim 1, further comprising, by said one or more computing devices, using the metadata tags to automatically identify uploaded content portions that are related to each other.

5. The method of claim 1, further comprising receiving, storing, and publishing user-specified ratings of particular content portions, such that the users can rate particular content portions and share their ratings with other users.

6. The method of claim 1, further comprising selectively exposing particular ones of said content portions to subsets of the users based on social networking connections formed between the users.

7. The method of claim 1, further comprising responding to a user request to insert a selected content portion into a selected document by automatically inserting the content portion together with a corresponding bibliography citation and one or more corresponding metadata tags.

8. The method of claim 1, further comprising, by said one or more computing devices, using the metadata tags to select content sources to recommend to users.

9. Non-transitory computer storage that stores executable instructions that direct a computing system to perform a process that comprises:

receiving a code that identifies a printed publication, said code obtained from a photograph of a representation of the code on a hardcopy of the printed publication, wherein the code is an ISBN code obtained from an ISBN bar code on the hardcopy;

receiving a user-selected content portion of the printed publication, wherein receiving the user-selected content portion comprises receiving a photograph of a user-selected portion of the hardcopy and applying OCR to the photograph to generate textual data;

retrieving information regarding the printed publication using said code;

generating a bibliographic citation for the content portion using the retrieved information regarding the printed publication; and storing the content portion in association with the bibliographic citation;

wherein the executable instructions include instructions of a mobile application that provides functionality for automatically generating citations based on photographic images taken with a mobile device on which the mobile application runs.

10. The non-transitory computer storage of claim 9, wherein the mobile application includes a user interface and associated functionality for inserting the content portion and bibliographic citation into a user-selected document.

11. The non-transitory computer storage of claim 9, wherein the mobile application is configured to automatically upload the content portion and bibliographic citation to a remote document management system in association with a user account.

12. The non-transitory computer storage of claim 9, wherein the mobile application includes a user interface for user entry of comments to be stored in association with the content portion.

13. A system that implements a service for assisting users in locating reference materials, comprising:

an electronic data repository that stores content clippings and associated citations and metadata tags, said content clippings uploaded to the electronic data repository by clipping modules that run on user computing devices of a plurality of users of the service, said citations identifying source references from which the content clippings were obtained, said metadata tags including text that is descriptive of the corresponding content clippings; and a computing system comprising one or more computing devices, said computing system programmed to use the metadata tags and citations to generate, for particular users of the service, recommendations of reference materials related to particular topics;

wherein the computing system is programmed to analyze a document of a user, and to generate, based on said metadata tags and citations, recommendations of particular reference materials related to the document;

wherein the computing system is additionally configured to use social network connections between the users to implement a content clipping sharing policy in which users selectively share uploaded content clippings with other users.

* * * * *